(12) United States Patent
Savage et al.

(10) Patent No.: US 10,291,312 B2
(45) Date of Patent: May 14, 2019

(54) STEERABLE ANTENNA ASSEMBLY UTILIZING A DIELECTRIC LENS

(71) Applicant: The Boeing Company, Chicago, IL (US)

(72) Inventors: Larry L. Savage, Huntsville, AL (US); Corey M. Thacker, Madison, AL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/984,202

(22) Filed: May 18, 2018

(65) Prior Publication Data

US 2019/0028175 A1    Jan. 24, 2019

Related U.S. Application Data

(63) Continuation of application No. 15/379,228, filed on Dec. 14, 2016, now Pat. No. 9,979,459.

(60) Provisional application No. 62/379,301, filed on Aug. 25, 2016.

(51) Int. Cl.
| | |
|---|---|
| *H04B 7/00* | (2006.01) |
| *H04B 7/08* | (2006.01) |
| *H01Q 19/06* | (2006.01) |
| *H01Q 15/08* | (2006.01) |
| *H01Q 13/06* | (2006.01) |
| *H01Q 3/34* | (2006.01) |
| *H01Q 1/28* | (2006.01) |
| *H01Q 1/24* | (2006.01) |
| *H01P 5/12* | (2006.01) |

(52) U.S. Cl.
CPC ........... *H04B 7/0874* (2013.01); *H01Q 1/241* (2013.01); *H01Q 1/28* (2013.01); *H01Q 3/34* (2013.01); *H01Q 13/06* (2013.01); *H01Q 15/08* (2013.01); *H01Q 19/062* (2013.01); *H01P 5/12* (2013.01)

(58) Field of Classification Search
CPC .......... H04B 7/0874; H01Q 1/28; H01Q 3/34; H01Q 13/06; H01Q 15/08; H01Q 19/062; H01P 5/12
See application file for complete search history.

*Primary Examiner* — Xin Jia

(57) ABSTRACT

A steerable antenna assembly ("SAA") for receiving a plurality of incident radio frequency ("RF") signals at a plurality of incident angles is disclosure. The SAA includes an approximately spherical dielectric lens ("SDL"), a waveguide aperture block ("WAB"), a switch aperture matrix ("SAM"), and a radial aperture combiner ("RAC"). The SDL receives and focuses the plurality of incident RF signals creating a plurality of focused RF signals at a plurality of focal points approximately along the back surface of the SDL. The WAB is positioned adjacent to the back surface of the SDL and receives the plurality of focused RF signals. The SAM electronically steers a beam of a radiation pattern produced by the SAA and switch between the pluralities of focused RF signals based on electronically steering the beam. The RAC produces a received RF signal from the plurality of focused RF signals.

20 Claims, 12 Drawing Sheets

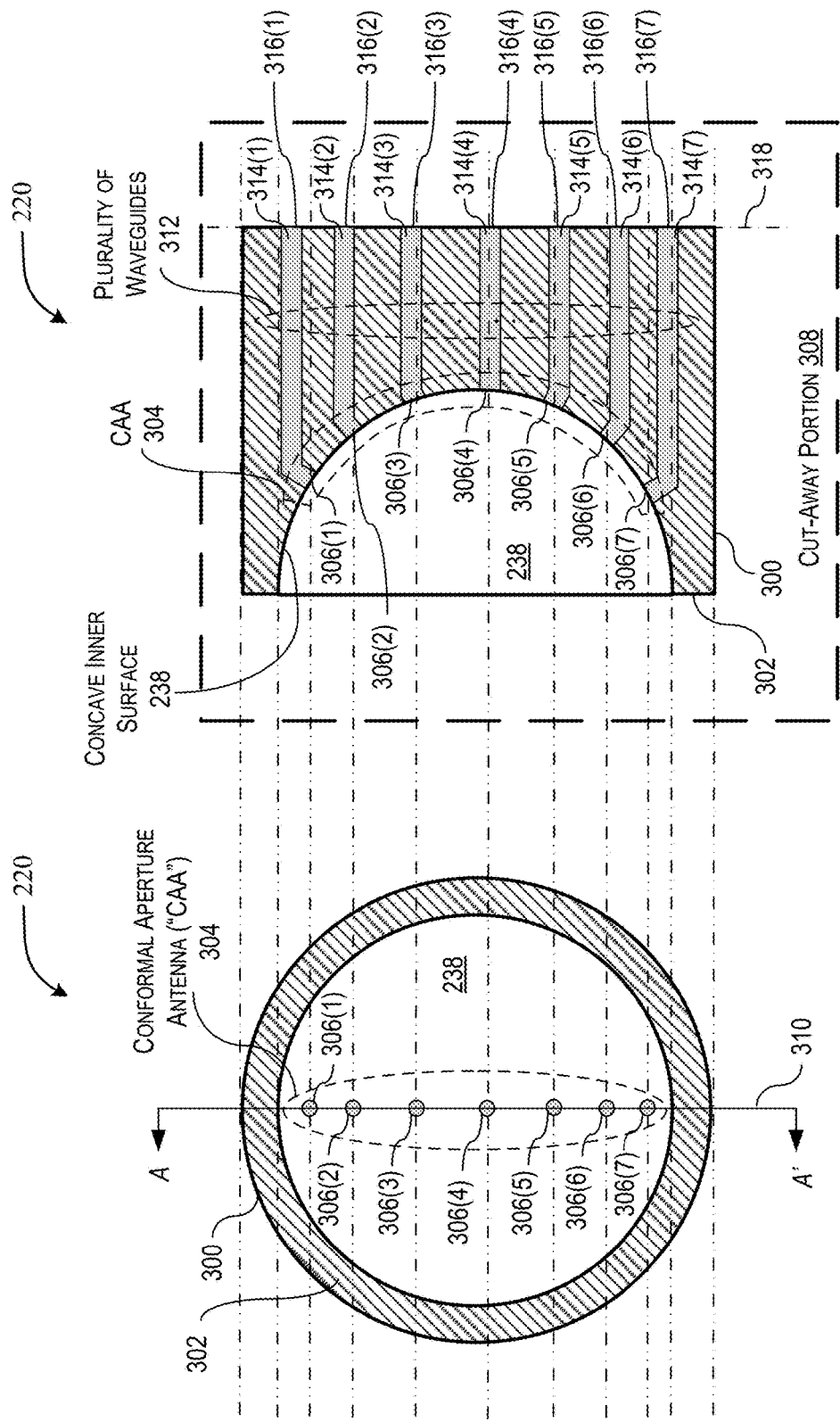

STEERABLE ANTENNA ASSEMBLY UTILIZING A DIELECTRIC LENS

CROSS-REFERENCE TO RELATED APPLICATION AND CLAIM OF PRIORITY

The present patent application is a continuation of U.S. Nonprovisional application Ser. No. 15/379,228, filed on Dec. 14, 2016, entitled "Steerable Antenna Assembly Utilizing a Dielectric Lens," to Larry L. Savage et al., which issued as U.S. Pat. No. 9,979,459 on May 22, 2018, which nonprovisional application claims priority under 35 U.S.C. § 119(e) to U.S. Provisional Application No. 62/379,031, filed on Aug. 24, 2016, entitled "User Terminal Including Dielectric Lens With Waveguide Assembly and Method of Using," to Larry Leon Savage et al., both of which applications are hereby incorporated herein by this reference in their entireties.

BACKGROUND

1. Field

The present disclosure relates generally to antennas and, more particularly, to an antenna system utilizing a spherical lens and an antenna array to electronically scan the antenna system.

2. Related Art

The use of unmanned aerial vehicles ("UAVs"), commonly referred to as drones, has experienced explosive growth in this decade. Most UAVs utilize wireless technologies to control and communicate data between the UAV and a user terminal ("UT"). The control and data performance of this wireless link significantly limits the range, maneuverability and overall functionality of the UAV. As UAV use has expanded, the wireless link capabilities have become a limiting factor in the UAV system application space.

The UAV wireless link consists of radios and antennas at the user terminal and in the aircraft. The primary wireless "weak point" in the link is the UT antenna. The UT antenna's ability to efficiently track the aerial vehicle in flight is a significant coverage and range limitation. Attempts to address this issue have included the use of multiple terrestrial UT locations, satellites, and mechanically articulated antennas. The costs, complexity and logistics of multi-site terrestrial systems has limited their application. Satellite system complexity and data latency makes real-time control and observation of UAVs extremely complex and expensive. Mechanically articulated antennas have significant response time and pointing accuracy issues tracking the aerial vehicle. In the area of operations of the UAV it is desired to have a single UT system that can track the aerial vehicle efficiently at sufficient range to accomplish the operational objectives.

At present, one of the solutions to address the tracking latency issue is to utilize a phased array antenna which provides high antenna gain and electronically controlled steerability over the antenna field of view. Phased array antennas are complex to setup and operate, consume large amounts of power, and are expensive so their practical application is limited to high-end systems. Therefore, there is a need for a cost effective advanced antenna design that addresses the UAV tracking problem.

SUMMARY

Disclosed is a steerable antenna assembly ("SAA") for receiving a plurality of incident radio frequency ("RF") signals at a plurality of incident angles. The SAA includes an approximately spherical dielectric lens ("SDL"), a waveguide aperture block ("WAB"), a switch aperture matrix ("SAM"), and a radial aperture combiner ("RAC"). The SDL includes a front surface and a back surface, where the SDL is configured to receive and focus the plurality of incident RF signals to create a plurality of focused RF signals at a plurality of focal points approximately along the back surface of the SDL. The plurality of focal points have positions along the back surface of the SDL that correspond to the plurality of incident angles of the plurality of incident RF signals. The WAB is positioned adjacent to the back surface of the SDL, where the WAB is in signal communication with the back surface of the SDL and the WAB is configured to receive the plurality of focused RF signals. The SAM in signal communication with the WAB and is configured to electronically steer a beam of a radiation pattern produced by the SAA and switch between the plurality of focused RF signals based on electronically steering the beam. The RAC is in signal communication with the SAM and is configured to produce a received RF signal from the plurality of focused RF signals.

The SAA may be part of a user terminal that includes an RF modem in signal communication with the SAA, where the RF modem is configured to receive the RF signal and demodulate the received RF signal to produce a received base-band signal, and a controller in signal communication with the SAA and the RF modem. The controller is configured to control the RF modem and the SAM to electronically steer the beam.

In an example of operation, the SAA performs a method that includes receiving the plurality of incident RF signals at the front surface of SDL and focusing the received plurality of incident RF signals to create the plurality of focused RF signals at the plurality of focal points approximately along the back surface of the SDL. The plurality of focal points have positions along the back surface of the SDL that correspond to the plurality of incident angles of the plurality of incident RF signals. The method further includes receiving the plurality of focused RF signals at the WAB positioned adjacent to the back surface of the SDL, switching between the plurality of focused RF signals based on electronically steering the beam of the radiation pattern produced by the SAA, and combining the switched plurality of focused RF signals to produce the received RF signal with the RAC. Moreover, the SAA is a reciprocal device capable of both receiving incident RF signals that imping on the SDL and transmitting input RF signals that are in injected into the RAC. In the example of transmitting the input RF signals, the SAM is configured to electronically steer the transmitted beam.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 3A is a top view of an example of an implementation of a cut-away portion of a waveguide aperture block ("WAB") shown in FIG. 2 in accordance with the present disclosure.

FIG. 3B is a side cross-section view of the cut-away portion of the WAB shown in FIG. 3A in accordance with the present disclosure.

DETAILED DESCRIPTION

Figure 1:
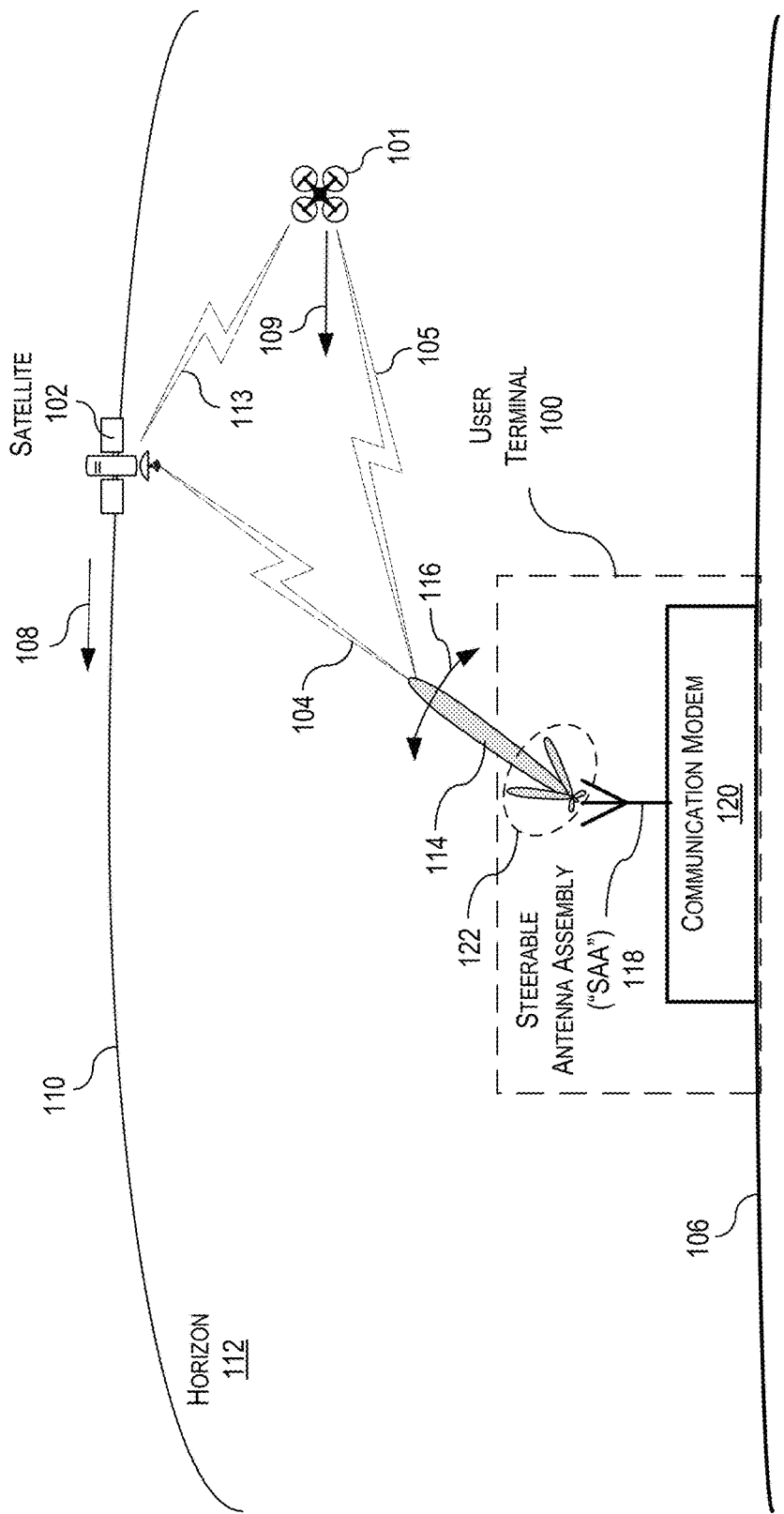
FIG. 1 is a system block diagram of an example of an implementation of a UAV user terminal in signal communication with a UAV, low-Earth-orbit ("LEO") or geosynchronous satellite via a signal path in accordance with the present disclosure.

A steerable antenna assembly ("SAA") for receiving a plurality of incident radio frequency ("RF") signals at a plurality of incident angles is disclosure. The SAA includes an approximately spherical dielectric lens ("SDL"), a waveguide aperture block ("WAB"), a switch aperture matrix ("SAM"), and a radial aperture combiner ("RAC"). The SDL includes a front surface and a back surface, where the SDL is configured to receive and focus the plurality of incident RF signals to create a plurality of focused RF signals at a plurality of focal points approximately along the back surface of the SDL. The plurality of focal points have positions along the back surface of the SDL that correspond to the plurality of incident angles of the plurality of incident RF signals. The WAB is positioned adjacent to the back surface of the SDL, where the WAB is in signal communication with the back surface of the SDL and the WAB is configured to receive the plurality of focused RF signals. The SAM in signal communication with the WAB and is configured to electronically steer a beam of a radiation pattern produced by the SAA and switch between the plurality of focused RF signals based on electronically steering the beam. The RAC is in signal communication with the SAM and is configured to produce a received RF signal from the plurality of focused RF signals.

The SAA may be part of a user terminal that includes an RF modem in signal communication with the SAA, where the RF modem is configured to receive the RF signal and demodulate the received RF signal to produce a received base-band signal, and a controller in signal communication with the SAA and the RF modem. The controller is configured to control the RF modem and the SAM to electronically steer the beam.

In an example of operation, the SAA performs a method that includes receiving the plurality of incident RF signals at the front surface of SDL and focusing the received plurality of incident RF signals to create the plurality of focused RF signals at the plurality of focal points approximately along the back surface of the SDL. The plurality of focal points have positions along the back surface of the SDL that correspond to the plurality of incident angles of the plurality of incident RF signals. The method further includes receiving the plurality of focused RF signals at the WAB positioned adjacent to the back surface of the SDL, switching between the plurality of focused RF signals based on electronically steering the beam of the radiation pattern produced by the SAA, and combining the switched plurality of focused RF signals to produce the received RF signal with the RAC. Moreover, the SAA is a reciprocal device capable of both receiving incident RF signals that imping on the SDL and transmitting input RF signals that are in injected into the RAC. In receive mode the modem would demodulate the SAA received RF signal to produce a base-band signal. In transmit mode the modem would modulate an RF carrier for transmission through the SAA. In both transmit and receive modes a controller would be configured to steer the SAA beam to the desired position.

In this disclosure, the SAA meets low cost, wide scan angle, fast scan rate, low re-pointing time, low sidelobe levels, low operating power and wide bandwidths needed for use in a UAV system or low-Earth orbiting ("LEO") communication or geosynchronous satellites or via a direct communication path to the UAV or satellite. The antenna system may also be used in a communications system, an aircraft (including the UAV), a vehicle, a missile system, and many other beam forming applications. Additionally, the SAA may utilize additive and/or subtractive high volume production manufacturing techniques for low cost fabrication of the SAA.

In FIG. 1, a system block diagram of an example of an implementation of a user terminal 100 (which may be a UAV control and data system or satellite terminal) in signal communication with a LEO or geosynchronous satellite 102 (herein referred to as "satellite 102") or a UAV 101 via a signal paths 104 or 105 is shown in accordance with the present disclosure. In this example, the user terminal 100 is shown as being on the surface of the Earth 106 but it is appreciated by those of ordinary skill in the art that the user terminal 100 may be instead be a communication terminal (including non-satellite communicating devices) that is part of a communications system, a vehicle, an aircraft (including the UAV 101), or a missile system. In this example, the user terminal 100 in signal communication with the UAV 101 (via signal path 105) or the satellite 102 (via signal path 104), where the Satellite 102 is traveling in direction 108 that is along an orbital trajectory 110 across a horizon 112 of the user terminal 100 and the UAV 101 is traveling in a direction 109 across the horizon 112. It is appreciated by those of ordinary skill in the art that if the satellite 102 is a geo stationary satellite (a special type of geosynchronous satellite with a geostationary orbit) it will not move along the orbital trajectory 110 since it will be stationary with regards to the surface of the Earth 106. It is also appreciated that instead of the user terminal 100 being in signal communication with UAV 101 directly via signal path 105, the user terminal 100 alternatively may be in signal communication with the UAV 101 via a combined signal path that includes signal path 104 to the satellite 102, the satellite 102, and a signal path 113 to the UAV 101 from the satellite 102. In this example, in order to maintain communication with either the UAV 101 along signal path 105 or the satellite 102 along signal path 104, the user terminal 100 includes devices, components, circuitry, etc. capable of producing an antenna radiation pattern having a beam 114 that is steerable 116 across the horizon 112. As such, the user terminal 100 includes a SAA 118 and communication modem 120 in signal communication with the SAA 118. In this example, the beam 114 is a beam of an antenna radiation pattern produced by the SAA 118 that also includes a plurality of side-lobes 122.

Figure 2:
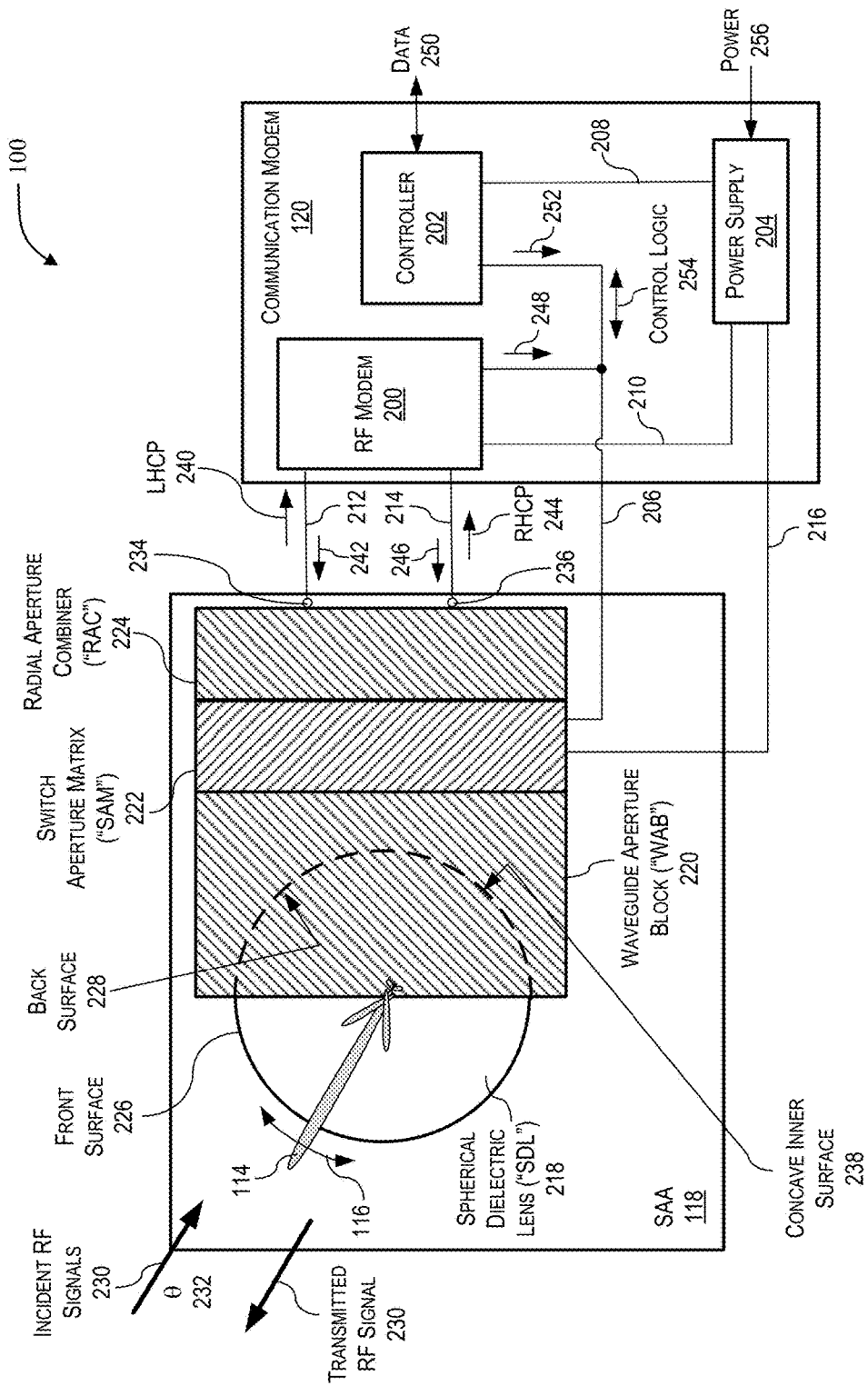
FIG. 2 is a system block diagram of an example of an implementation of the user terminal shown in FIG. 1 in accordance with the present disclosure.

In FIG. 2, a system block diagram of an example of an implementation of the user terminal 100 (shown in FIG. 1) is shown in accordance with the present disclosure. In this example, the communication modem 120 may include a radio frequency ("RF") modem 200, controller 202, and power supply 204. The controller 202 may be in signal communication with both the RF modem 200 and power supply 204 via signal paths 206 and 208, respectively. The power supply 204 is also in signal communication with the RF modem 200 via signal path 210. The RF modem 200 is also in signal communication with the SAA 118 via signal paths 212 and 214 and the controller 202 and power supply 204 are also in signal communication with the SAA 118 via signal paths 206 and 216, respectively.

The SAA 118 includes an approximately spherical dielectric lens ("SDL") 218, a waveguide aperture block ("WAB") 220, a switch aperture matrix ("SAM") 222, and a radial aperture combiner ("RAC") 224. The SDL 218 includes a front surface 226 and a back surface 228. In this example, the SDL 218 is configured to receive and focus a plurality of incident RF signals 230 to create a plurality of focused RF signals at a plurality of focal points (not shown) approximately along the back surface 228 of the SDL 218 and where the plurality of focal points have positions along the back surface 228 of the SDL 228 that correspond to the plurality of incident angles θ 232 of the plurality of incident RF signals 230. In this example, the SAM 222 is in signal communication with the controller 202 and the power supply 204 via signal paths 206 and 216, respectively. Additionally, the RAC 224 includes a first and second waveguide input-output ("IO") ports 234 and 236, where both the first and second waveguide IO ports 234 and 236 are configured to be "output" ports (i.e., they produce output signals) when the SAA 118 is receiving an incident RF signal (of the plurality of incident RF signals 230) and, when the SAA 118 is transmitting a transmitted RF signal, the first and second waveguide IO ports 234 and 236 are configured to be "input" ports (i.e., they receive input signals) and receive an input RF signal from the RF modem 200.

In this example, the SDL 218 has a shape that is approximately a sphere or an oblate spheroid with a sphericity variation that is less than approximately 0.01 wavelength of an operating RF frequency of the SAA 118, where the operating frequency of the SAA 118 may be in a range, for example, of approximately between K-band to W-band (i.e., from approximately 18 GHz to 110 GHz). It is appreciated by those of ordinary skill in the art that lower frequencies may also be utilized but this would result in the SDL 218 having a larger diameter. In the case of K-band, the SDL 218 may have a diameter of, for example, approximately 152.4 mm that is scalable based on the designed frequency of operation of the SAA 118. Additionally, the SDL may have a dielectric constant that is constant or varying between approximately 2 and 5 for providing a loss tangent of less than about 0.001. It is appreciated by those of ordinary skill in the art that the dielectric constant is the ratio of the permittivity of a substance to the permittivity of free space and that it is an expression of the extent to which a material concentrates electric flux such that as the dielectric constant increases, the electric flux density increases.

Moreover, the SDL 218 may have a gradient of decreasing refractive index radially out from a center (shown in FIG. 6 as 604) of the SDL 218. As such, the SDL may be, for example, a Luneburg lens, where the Luneburg lens is a spherical lens generally having a gradient of decreasing refractive index radially out from its center and where the focusing properties may be achieved through an infinite number of refractive-index solutions.

In general, the SDL 218 may be constructed of materials that include, for example, a thermoset plastic, a polycarbonate, a cross-linked polystyrene copolymer, and Polytetrafluoroethylene ("PTFE"). As such, example materials include REXOLITE® and TEFLON®. REXOLITE® 1422 is manufactured by C-Lec Plastics, Inc. of Philadelphia, Pa. and may be available as a dielectric lens from San Diego Plastics, Inc. of National City, Calif., or elsewhere. TEFLON® is available from The Chemours Company of Wilmington, Del., and may be available as a dielectric lens from Applied Plastics Technology, Inc. of Bristol, R.I., or elsewhere. In this example, the SDL 218 may be formed by injection molding or some other process (e.g. 3-D printing or additive manufacturing). In this example, the SAA 118 may optionally include a radome (shown in FIG. 8 as 800) disposed adjacent to the front surface 226 of the SDL 218.

Turning to the WAB 220, the WAB 220 is a device, component, or module that includes a concave inner surface 238 positioned adjacent to the back surface 228 of the SDL 218 and a conformal aperture array antenna ("CAA") (shown as 304 in FIGS. 3A and 3B) along the concave inner surface 238. In this example, the CAA 304 is in signal communication with the back surface 228 of the SDL 218 and includes a plurality of aperture elements (shown in FIGS. 3A and 3B as 306(1), 306(2), 306(3), 306(4), 306(5), 306(6), and 306(7)). In this example, the back surface 228 of the SDL 218 is ideally flush with the concave inner surface 238 so as to minimize any space between back surface 228 of the SDL 218 and the concave inner surface 238 because any spacing between the back surface 228 and concave inner surface 238 will produce an impedance mismatch that will result in RF reflections between the back surface 228 and concave inner surface 238. This impedance mismatch will result in losses and will increase the side-lobes 122 of the radiation pattern of the SAA 118 and resulting reduce the gain and directivity of the SAA 118. However, it is appreciated that based on the utilization of some materials for the SDL 218, there may alternatively be situations where the design will include a small spacing between the back surface 228 and concave inner surface 238 and the SDL 218 to properly match the SDL 218 and concave inner surface 238.

In this example, the WAB 220 includes a plurality of waveguides (shown in FIG. 3B as 312) in signal communication with the CAA 304, where each waveguide (shown in FIG. 3B as 314(1), 314(2), 314(3), 314(4), 314(5), 314(6), and 314(7)), of the plurality of waveguides, includes a waveguide aperture (shown in FIGS. 3A and 3B as 306(1), 306(2), 306(3), 306(4), 306(5), 306(6), and 306(7) as aperture elements) in signal communication with the CAA 304. Each waveguide aperture, of each waveguide of the plurality of waveguides, corresponds to an aperture element 306(1), 306(2), 306(3), 306(4), 306(5), 306(6), and 306(7) of the plurality of aperture elements of the CAA 304. As an example, the WAB is constructed of metal or metalized plastics.

Figure 10:
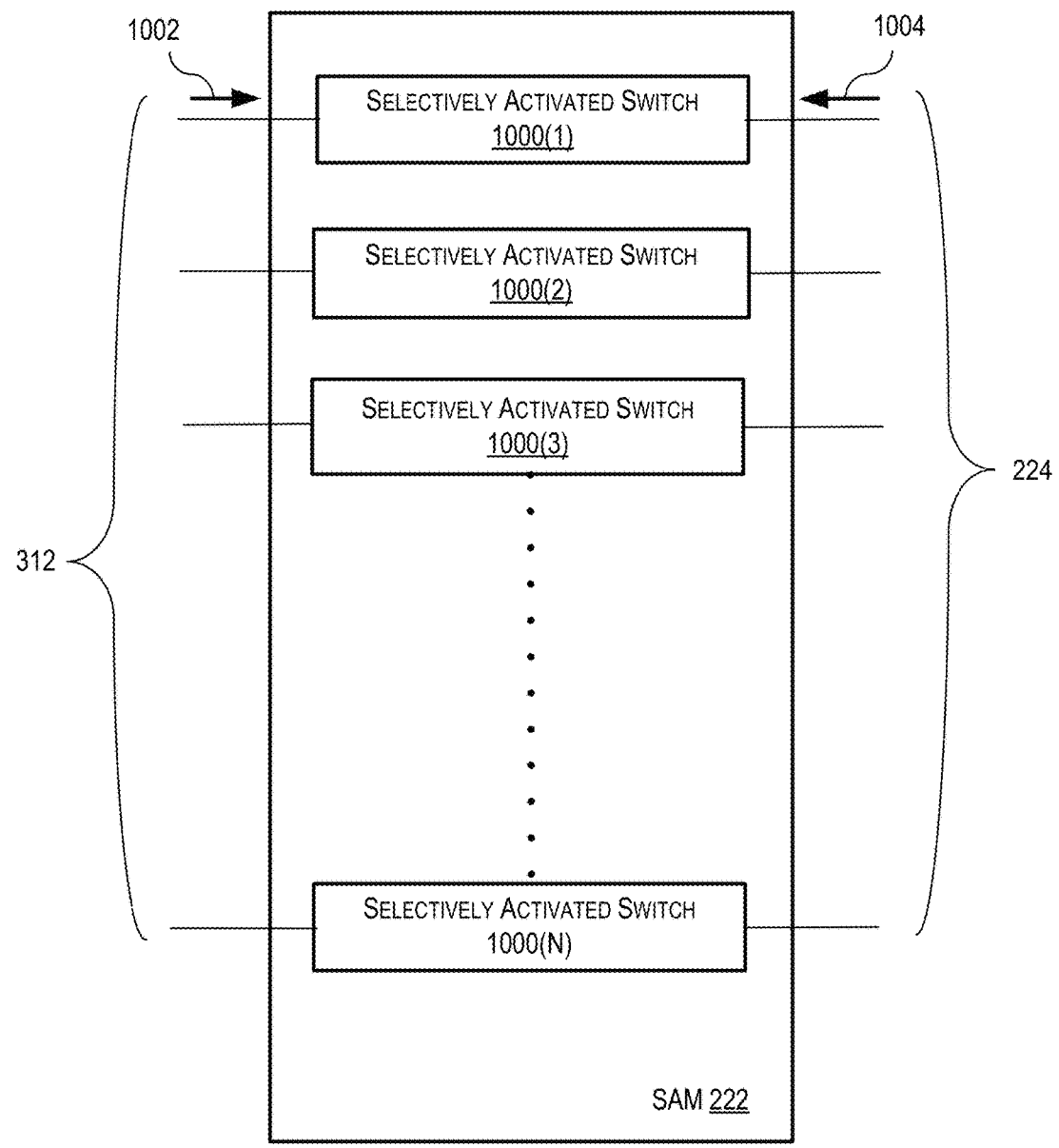
FIG. 10 is a block diagram of an example of an implementation of a switch aperture matrix ("SAM") shown in FIG. 2 in accordance with the present disclosure.

The SAM 222 is a device, component, circuit, or module that includes a plurality of selectively activated switches (shown in FIG. 10 as 1000(1), 1000(2), 1000(3), and 1000 (N)), where each selectively activated switch, of the plurality of selectively activated switches, is in signal communication with a corresponding waveguide from the plurality of waveguides (shown in FIG. 3B as 312) of the WAB 220 and the RAC 224. In this example, each selectively activated switch is configured to conduct or block a waveguide output signal from the corresponding waveguide output port to the RAC 224 if the SAA 118 is operating in a receiving mode. If, instead, the SAA 118 is operating in a transmitting mode, each selectively activated switch is configured to conduct or block an input RF signal from the RAC 224 to each corresponding waveguide input port. In this example, it is appreciated by those of ordinary skill in the art that these waveguide ports are referred to as "waveguide output ports" if the SAA 118 is in receiving mode and the waveguide ports are producing output RF signals corresponding to the received incident RF signals 230. Alternatively, the same waveguide ports are referred to as "waveguide input ports" if the SAA 118 is in transmitting mode and the waveguide ports are receiving input RF signals corresponding from the RAC 224. In this example, each selectively activated switch includes a switching device (not shown) that may be, for example, a PIN diode, latching ferrite switch, liquid crystal valve ("LCV"), coaxial waveguide switch, plasma switch, and an RF isolator.

The RAC 224 is a device, component, circuit, or module that is configured to receive the switched outputs (not shown) from the SAM 222 and combine them routes them to the IO ports 234 and 236 in the receiving mode. As an example, the RAC 224 may be a radial power combiner and divider utilizing waveguide, coaxial transmission lines, or solid-state technologies (e.g., striplines or microstrips). In the transmitting mode, the RAC 224 receives an input RF signal (not shown) and routes it to one of more selectively activated switches in the SAM 222. In this example, two IO ports 234 are 236 are shown to produce or receive polarized RF signals that are routed to or from the RF modem 200 via signal paths 212 and 214, respectively. For example, first IO port 234 is shown to produce a first polarized output signal 240 that is passed from the RAC 224 to the RF modem 200 in a receive mode and, in a transmit mode, to receive a first polarized input signal 242 from the RF modem 200 to the RAC 224. Similarly, the second IO port 236 is shown to produce a second polarized output signal 244 that is passed from the RAC 224 to the RF modem 200 in a receive mode and, in a transmit mode, to receive a second polarized input signal 246 from the RF modem 200 to the RAC 224. In this example, the first polarization may be left-hand circular polarization ("LHCP") and the second polarization may be right-hand circular polarization ("RHCP"). It is appreciated by those of ordinary skill in the art that two IO ports 234 are 236 may include a single waveguide IO port having a polarizer such as, for example, a septum polarizer.

In this example, the RF modem 200 is a device, component, circuit, or module that is configured to receive either the first polarized output signal 240 or second polarized output signal 244 and then demodulate either one to produce a received base-band signal 248 that is passed to the controller 202 via signal path 206. The controller 202 then may receive the base-band signal 248 to produce data 250 that is output from the controller 202 to other devices, components, circuits, or modules of the user terminal 100. The data 250 may also be routed to other external devices in signal communication with the user terminal 100 via connections such as, for example, an Ethernet connection. In this example, the RF modem 200 is also configured to receive an input based-band signal 252 from the controller 202 and then modulate the input based-band signal 252 to produce either the second polarized output signal 244 or the second polarized input signal 246 that are routed to the IO ports 234 and 236, respectively.

The controller 202 is a device, component, circuit, or module that includes a processor, digital signal processor ("DSP"), application specific integrated circuit ("ASIC"), field programmable gate array ("FPGA"), or equivalent. The controller 202 produces control logic signals 254 that are passed and received from the RF modem 200 and SAM 222. The control logic signals 254 provide synchronized control signals to both the SAM 222 and RF modem 200 to selectively receive and demodulate input RF signals (such as, for example first polarized output signal 240 or second polarized output signal 244) or selectively modulate and transmit RF signals (such as, for example, second polarized input signal 242 or second polarized input signal 246) through the SAA 118. In this example, by controlling the selectively activated switches within the SAM 222 with the control logic signals 254, the controller 202 is configured to electronically steer the beam 114 with the SAM 222.

The power supply 204 is a device, component, circuit, or module that is configured to receive external power 256 and produce the appropriate power signals for the SAM 222, controller 202, and RF modem 200 via signal path 216, 208, and 210, respectively. The SAA 118 may also include stepper motor (shown in FIG. 12 as 1200) that is configured to selectively rotate the WAB 220 and SDL 218 based on a control signal (shown in FIG. 12 as 1204) from the controller 202.

It is appreciated by those skilled in the art that the circuits, components, modules, and/or devices of, or associated with, the user terminal 100, SAA 118, and communication modem 120 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

In an example of operation, the SAA 118 performs a method that includes receiving the plurality of incident RF signals 230 at a front surface 226 of the SDL 218 and focusing the received plurality of incident RF signals 230 to create a plurality of focused RF signals at a plurality of focal points approximately along the back surface 228 of the SDL 218, where the plurality of focal points have positions along the back surface 228 of the SDL 218 that correspond to the plurality of incident angles 232 of the plurality of incident RF signals 230. The method also includes receiving the plurality of focused RF signals at the WAB 220 that is positioned adjacent to the back surface 228 of the SDL 218 and switching between the pluralities of focused RF signals based on electronically steering the beam 114 of the radiation pattern produced by the SAA 118. Moreover, the method includes combining the switched plurality of focused RF signals (not shown) to produce the received RF signal (i.e., LHCP 240 and RHCP 244) with the RAC 224. In this example, the switching conducting or blocking a plurality of output signals, from the corresponding plurality of waveguide output ports, from the WAB 220 to the RAC 224. The method may also include rotating the WAB 220 and SDL 218 with the stepper motor 1200 based on the control signal 1204 from the controller 202.

In FIG. 3A, a top view of an example of an implementation of a cut-away portion of the WAB 220 is shown in accordance with the present disclosure. In this example, the WAB 220 includes the concave inner surface 238, an outside surface 300 of the WAB 220, and a lip 302 between the concave inner surface 238 and the outside surface 300. The lip 302 may have a thickness that is wide enough to allow a mounting flange (not shown) for the SDL 218. If a mounting flange (not shown) is utilized, the lip 302 may include a plurality of down pin holes (not shown) and screw holes (not shown) to line up and attaching the mounting flange (not shown) to the lip 302. In this example, the concave inner surface 238 includes the CAA 304, where the CAA 304 includes a plurality of aperture elements 306(1), 306(2), 306(3), 306(4), 306(5), 306(6), and 306(7). In this example, each aperture element 306(1), 306(2), 306(3), 306(4), 306(5), 306(6), and 306(7) is a waveguide aperture (i.e., an opening of the waveguide that will allow the reception or transmission of RF signals into or out of the waveguide). In general, the CAA 304 is "bowl" shaped composed of either solid metal and/or metalized plastic. It is a reciprocal device capable of simultaneously transmitting and receiving RF signals within the selected directions of arrival (i.e., the plurality of incident angles 232) and will minimize RF insertion and polarization losses.

Turing to FIG. 3B, a side cross-section view of the cut-away portion 308 of the WAB 220 is shown in accordance with the present disclosure. Specifically, FIG. 3B is a cross-sectional view of the cut-way portion 308 of the WAB 220 along cutting plane A-A' 310 looking into the WAB 220. As discussed earlier, the WAB 220 includes a plurality of waveguides 312 in signal communication with the CAA 304, where each waveguide 314(1), 314(2), 314(3), 314(4), 314(5), 314(6), and 314(7), of the plurality of waveguides 312, includes a waveguide aperture (which in this example corresponds to the aperture element 306(1), 306(2), 306(3), 306(4), 306(5), 306(6), and 306(7)) in signal communication with the CAA 304. It is appreciated by those of ordinary skill in the art that in this example each waveguide aperture 306(1), 306(2), 306(3), 306(4), 306(5), 306(6), and 306(7), of each waveguide 314(1), 314(2), 314(3), 314(4), 314(5), 314(6), and 314(7) of the plurality of waveguides 312, corresponds to an aperture element 306(1), 306(2), 306(3), 306(4), 306(5), 306(6), and 306(7) of the plurality of aperture elements of the CAA 304 because each waveguide aperture 306(1), 306(2), 306(3), 306(4), 306(5), 306(6), and 306(7) is by definition a radiating element 306(1), 306(2), 306(3), 306(4), 306(5), 306(6), and 306(7). In this example, the WAB 220 and each waveguide 314(1), 314(2), 314(3), 314(4), 314(5), 314(6), and 314(7) may be constructed of metal or metalized plastics.

Also as discussed earlier, in this example, the back surface 228 of the SDL 218 is ideally flush with the concave inner surface 238 so as to minimize any space between back surface 228 of the SDL 218 and the concave inner surface 238 because any spacing between the back surface 228 and concave inner surface 238 will produce an impedance mismatch that will result in RF reflections between the back surface 228 and concave inner surface 238. It is appreciated that any space between the back surface 228 and concave inner surface 238 will act as a dielectric layer (with a dielectric constant of approximately 1.00059 at 25° C.) between the dielectric material of the SDL 218 at the back surface 228 and the openings of each waveguide aperture causing reflections at the spacing layer (back into the SDL 218 and/or the 306(1), 306(2), 306(3), 306(4), 306(5), 306(6), and 306(7)) based on the wavelengths of RF signals within the frequency of operation. Additionally, based on the wavelengths of RF signals within the frequency of operation, the spacing layer may allow power dissipation along the surfaces of the both the back surface 228 of the SDL 218 and the concave inner surface 238 causing power loss and potential cross-talk between the different waveguide apertures 306(1), 306(2), 306(3), 306(4), 306(5), 306(6), and 306(7). These effects will cause the impedance mismatch that will result in losses and will increase the side-lobes 122 of the radiation pattern of the SAA 118 and resulting reduce the gain and directivity of the SAA 118.

In this example, each aperture element 306(1), 306(2), 306(3), 306(4), 306(5), 306(6), and 306(7) of the CAA 304 may be an elliptical aperture, where, correspondingly, each waveguide aperture 306(1), 306(2), 306(3), 306(4), 306(5), 306(6), and 306(7) of the each waveguide 314(1), 314(2), 314(3), 314(4), 314(5), 314(6), and 314(7) of the plurality of waveguides 312 is an elliptical aperture. Alternatively, each aperture element may be rectangular but in the case of elliptically polarized incident RF signals 230 or transmitted RF signals 230, the resulting focal points of the SDL 218 tend to be elliptical, or even circular, in shape. Since most communication systems utilizing elliptical polarization actually utilize either LHCP or RHCP, the aperture elements 306(1), 306(2), 306(3), 306(4), 306(5), 306(6), and 306(7) and corresponding waveguide apertures 306(1), 306(2), 306(3), 306(4), 306(5), 306(6), and 306(7) may be circular. Additionally, for ease of fabrication purposes, each circular aperture element 306(1), 306(2), 306(3), 306(4), 306(5), 306(6), and 306(7) may be three-dimensionally printed or drilled out of the concave inner surface 238. In this example, it is appreciated by those of ordinary skill in the art that the circularly shaped waveguide apertures may operate with a dominant transverse electromagnetic mode that is $TE_{11}$ mode.

In this example, all of the waveguides 314(1), 314(2), 314(3), 314(4), 314(5), 314(6), and 314(7) of the plurality of waveguides 312 include a first port and a second port where each first port corresponds to each waveguide aperture 306(1), 306(2), 306(3), 306(4), 306(5), 306(6), and 306(7) and the second port corresponds to the IO port 316(1), 316(2), 316(3), 316(4), 316(5), 316(6), and 316(7) that is in signal communication with the SAM 222.

In the case of circularly shaped aperture elements 306(1), 306(2), 306(3), 306(4), 306(5), 306(6), and 306(7), each waveguide 314(1), 314(2), 314(3), 314(4), 314(5), 314(6), and 314(7) will need to be either partially or completely a circular waveguide (i.e., circularly shaped) based on the design of the WAB 220, SAM 222, and RAC 224. In this example, the plurality of waveguides 312 includes a sub-plurality of waveguides that includes 314(1), 314(2), 314(3), 314(5), 314(6), and 314(7), where the each waveguide 314(1), 314(2), 314(3), 314(5), 314(6), and 314(7) of the sub-plurality of waveguides includes a waveguide length (shown in FIG. 9 as 900), a waveguide directional transition (shown in FIG. 9 as bend 904), and optionally a waveguide transition (shown in FIG. 9 as circular-to-rectangular transition 906) from the circular aperture 306(1), 306(2), 306(3), 306(5), 306(6), and 306(7) to a rectangular waveguide. In this example, the middle waveguide 314(4) having the waveguide aperture 306(4) includes a waveguide length and optionally a waveguide transition from the circular aperture 306(4) to a rectangular waveguide but does not need a waveguide directional transition since it is shown as being a straight waveguide in this example.

In this example, the SAM 222 and RAC 224 will operate with rectangular waveguides that have a dominant transverse electromagnetic mode that is $TE_{10}$ mode. In order to pass RF signals from or to the circular waveguide apertures 306(1), 306(2), 306(3), 306(4), 306(5), 306(6), and 306(7) from or to a rectangular waveguide, each waveguides 314(1), 314(2), 314(3), 314(4), 314(5), 314(6), and 314(7) needs a circular-to-rectangular waveguide transition (generally known as a mode transition) which are generally well known by those of ordinary skill in the art.

Moreover, in this example, each waveguide aperture 306(1), 306(2), 306(3), 306(4), 306(5), 306(6), and 306(7) is aligned with the center 604 of the SDL 218 and each waveguide IO port 316(1), 316(2), 316(3), 316(4), 316(5), 316(6), and 316(7) is aligned the other waveguide output ports 316(1), 316(2), 316(3), 316(4), 316(5), 316(6), and 316(7) along a plane of alignment 318 where the WAB 220 is connected to the SAM 222. Furthermore, each IO port 316(1), 316(2), 316(3), 316(4), 316(5), 316(6), and 316(7) is in signal communication with the SAM 222.

In this example, each waveguide 314(1), 314(2), 314(3), 314(5), 314(6), and 314(7) of the sub-plurality of waveguides 312 has a directional translation that bends (i.e., changes the direction) the waveguide 314(1), 314(2), 314(3), 314(5), 314(6), and 314(7) so that each waveguide aperture 306(1), 306(2), 306(3), 306(4), 306(5), 306(6), and 306(7) is aligned (i.e., is directed to) with the center 604 of the SDL 218 and the IO ports 316(1), 316(2), 316(3), 316(4), 316(5), 316(6), and 316(7) are aligned with the plane of alignment 318. As an example, the bends may be either H-bends (i.e., a bend that distorts the magnetic field) or E-bends (i.e., a bend that distorts the electric field) for rectangular waveguides or E-bends for circular waveguides.

As an example of an alternative implementation, the plurality of waveguides 312 may include different types of transmission lines that include waveguides, coaxial transmission lines, solid-state waveguides, hybrid transmission lines of waveguides and solid-state waveguides, hybrid transmission lines of coaxial and waveguides, hybrid transmission lines of coaxial and solid-states waveguides or any other combination capable of transmitting RF signals at the frequency of operation. In this disclosure, solid-state waveguides include microstrip or stripline circuits. In the case of solid-state waveguides, the waveguide apertures may be implemented as utilizing microstrip antennas fabricated using microstrip techniques on a printed circuit board ("PCB"). As an example, the microstrip antenna may be implemented as a patch antenna.

In this example, only seven (7) aperture elements of the CAA 304 and waveguides 314(1), 314(2), 314(3), 314(5), 314(6), and 314(7) are shown. This is for purposes of ease of illustration and it is appreciated by of ordinary skill in the art the CAA 304 may include many more radiating elements that may be distributed in a conformal fashion along the entire concave inner surface 238 of the CAA 304. Likewise, the plurality of waveguides 312 may include many more waveguides three-dimensionally within the WAB 220, where each waveguide corresponds to each radiating elements of the CAA 304.

Figure 5:
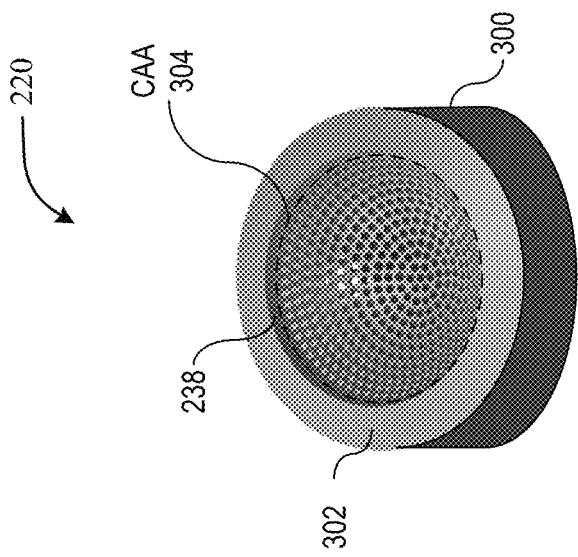
FIG. 5 is a perspective view of another example of an implementation of the CAA shown in FIGS. 3A and 3B in accordance with the present disclosure.
Figure 4:
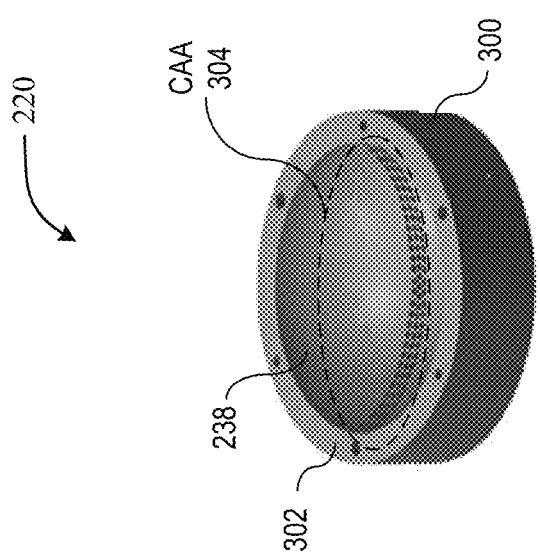
FIG. 4 is a perspective view of an example of an implementation of a conformal aperture array antenna ("CAA") shown in FIGS. 3A and 3B in accordance with the present disclosure.

Turning to FIG. 4, a perspective view of an example of an implementation of a CAA 304 is shown in accordance with the present disclosure. This example is similar to the one shown in FIGS. 3A and 3B except that the CAA 304 for illustration purposes was shown having seven (7) aperture elements, while in this example the CAA 304 is shown having eighty-five (85) aperture elements. Similarly, in FIG. 5, a perspective view of another example of an implementation of the CAA 304 is shown, in accordance with the present disclosure, where the CAA 304 includes, for example, 1,112 aperture elements.

Figure 6:
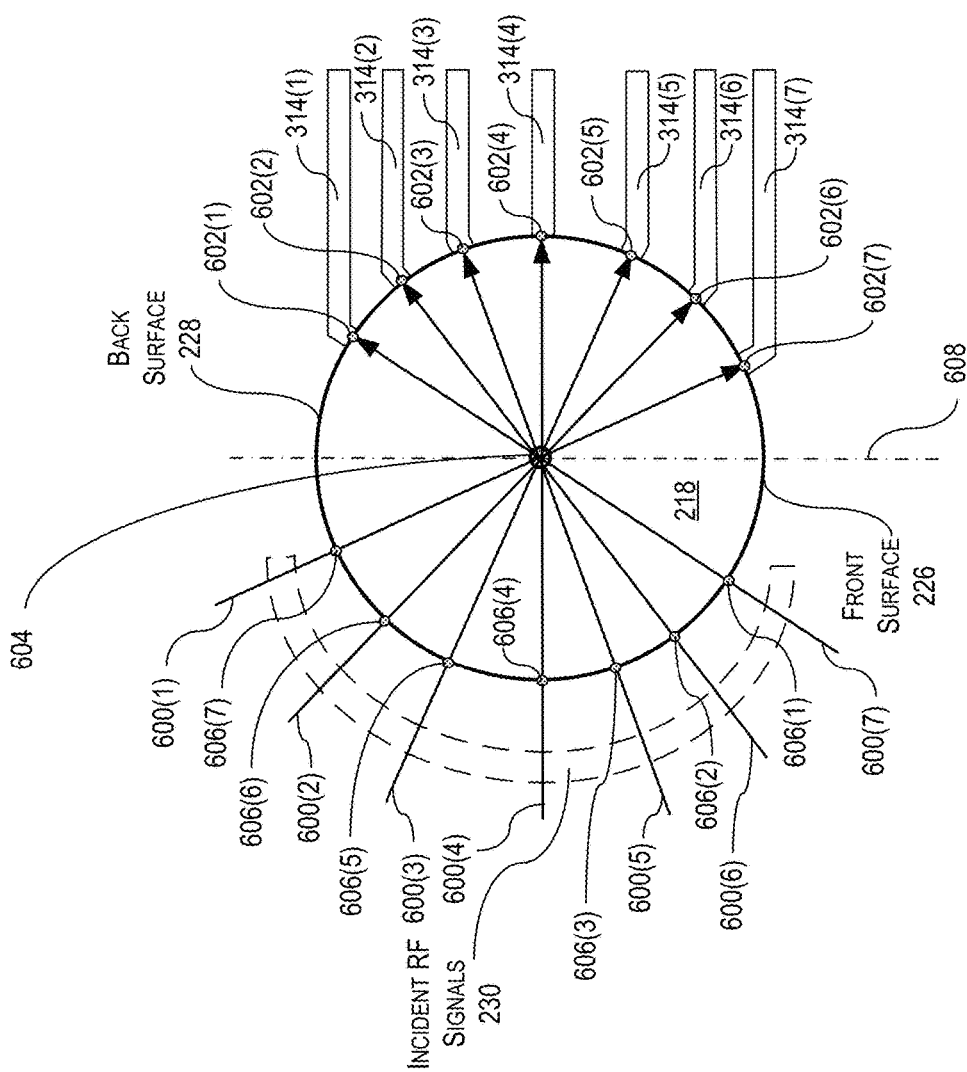
FIG. 6 is a system view of an example of an implementation of an approximately spherical dielectric lens ("SDL") shown in FIGS. 2, 3A, and 3B in accordance with the present disclosure.

In FIG. 6, a system view of an example of an implementation of SDL 218 is shown in accordance with the present invention. In this example, incident RF signals 230 are shown as plurality of individual incident RF signals 600(1), 600(2), 600(3), 600(4), 600(5), 600(6), and 600(7) arriving at the SDL 218 from incident different angles 232. Again for the purposes of ease of illustration, only seven (7) individual incident RF signals are shown but it is appreciated that there may be many more individual incident RF signals that imping on the front surface 226 of the SDL 218. In an example of operation, when the individual incident RF signals 600(1), 600(2), 600(3), 600(4), 600(5), 600(6), and 600(7) imping on the front surface 226 of the SDL 218 then travel through dielectric of the SDL 218 and focus on to the corresponding focal points 602(1), 602(2), 602(3), 602(4), 602(5), 602(6), and 602(7), respectively. In this example for ease of illustration the individual incident RF signals 600(1), 600(2), 600(3), 600(4), 600(5), 600(6), and 600(7) are shown traveling through the center 604 of the SDL 218 will traveling to the corresponding focal points 602(1), 602(2), 602(3), 602(4), 602(5), 602(6), and 602(7), however it is appreciated that the purpose of the illustration is to show that any individual incident RF signals 600(1), 600(2), 600(3), 600(4), 600(5), 600(6), and 600(7) impinging the front surface 226 of the SDL 218 will be focused at a focal point located approximately on the back surface 228 of the SDL 218 that is at the opposite side of the point where the individual incident RF signal impinged on the front surface 226 of the SDL 218. In this example, the focal points 602(1), 602(2), and 602(3) would correspond to the individual incident RF signals 600(7), 600(6), and 600(5) impinging the front surface 226 of the SDL 218 at impinging points 606(1), 606(2), and 606(4), respectively. The focal point 602(4) would correspond to the individual incident RF signal 600(4) impinging the front surface 226 of the SDL 218 at impinging point 606(4). Moreover, the focal points 602(5), 602(6), and 602(7) would correspond to the individual incident RF signals 600(3), 600(2), and 600(1) impinging the front surface 226 of the SDL 218 at impinging points 606(5), 606(6), and 606(7), respectively. In this example, the focal points 602(1), 602(2), 602(3), 602(4), 602(5), 602(6), and 602(7) correspond to the waveguides 314(1), 314(2), 314(3), 314(5), 314(6), and 314(7), respectively. Additionally, for purposes of illustration the front surface 226 of the SDL 218 is shown to be the surface of a front hemisphere of the SDL 218 and the back surface 228 of the SDL 218 is shown to be a surface of a back hemisphere of the SDL 218 that is designated by a hemispherical division plane 608. Utilizing this approach, the SDL 218 is capable of wide scans (up to approximately ±60 degrees or more) in both azimuth and elevation.

Figure 7A:
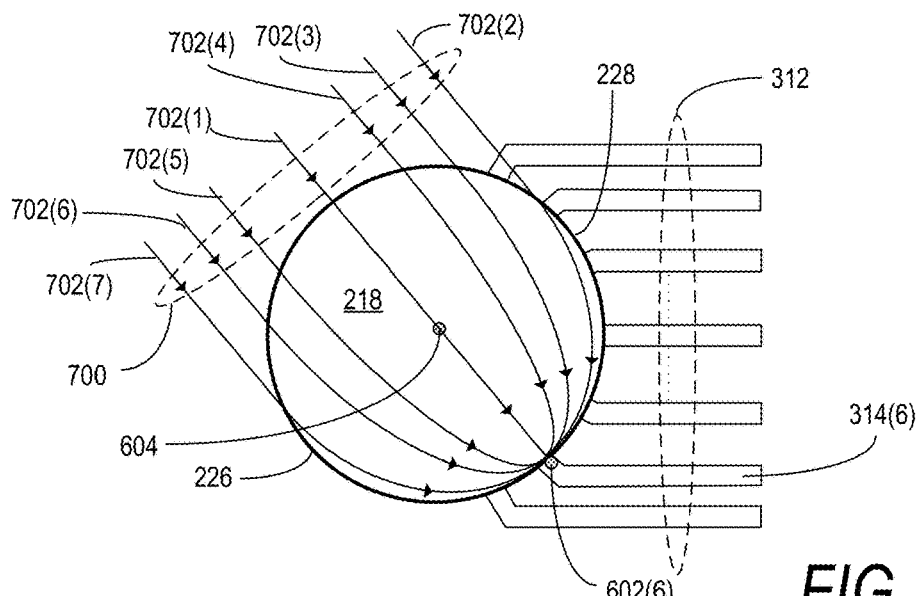
FIG. 7A is a system view of another example implementation of the SDL receiving an incident RF signal at a first angle in accordance with the present disclosure.

In FIG. 7A, a system view of another example implementation of the SDL 218 receiving an incident RF signal 700 at a first angle is shown in accordance with the present disclosure. In this example, the incident RF signal 700 is a RF signal from the incident RF signals 230 and the SDL 218 is a Lundeberg type lens having a gradient of decreasing refractive index radially out from the center 604. In this example, the SDL 218 has an index of refraction of one (1) at the surface and an index of refraction equal to the square root of two (2) (i.e., approximately 1.414) at the center 604.

In this example, as the distance from the center 604 of an SDL 218 is increased, the index of refraction gradually decreases. The geometry and refractive properties of the SDL 218 causes the incident RF signal 700 to travel to a location on the opposite side of the SDL 218 at the focal point 602(6) and exit the SDL 218 to the waveguide 314(6). In this example, an incident plane wave of the incident RF signal 700 may be represented by a plurality of parallel waves of radiation 702(1), 702(2), 702(3), 702(4), 702(5), 702(6), and 702(7) impinging on the front surface 226 of the SDL 218. As such, the wave 702(1) that impinges the front surface 226 at a normal passes through the center 604 of the SDL 218 along a centerline of the SDL 218 and exits at focal point 602(6) on the opposite side of the back surface 228 of the SDL 218. The other incident parallel waves of radiation, represented by lines 702(2), 702(3), 702(4), 702(5), 702(6) and 702(7), imping the SDL 218 at various locations along the front surface 226 of the SDL 218 and travel through the SDL 218 in paths dictated by the geometric and refractive properties of the SDL 218 so as to arrive at the same exit location at focal point 602(6). As such, in this example the SDL 218 focuses the most of the energy from the incident RF signal 700 to the focal point 602(6) and passes it to the waveguide 314(6).

Figure 7B:
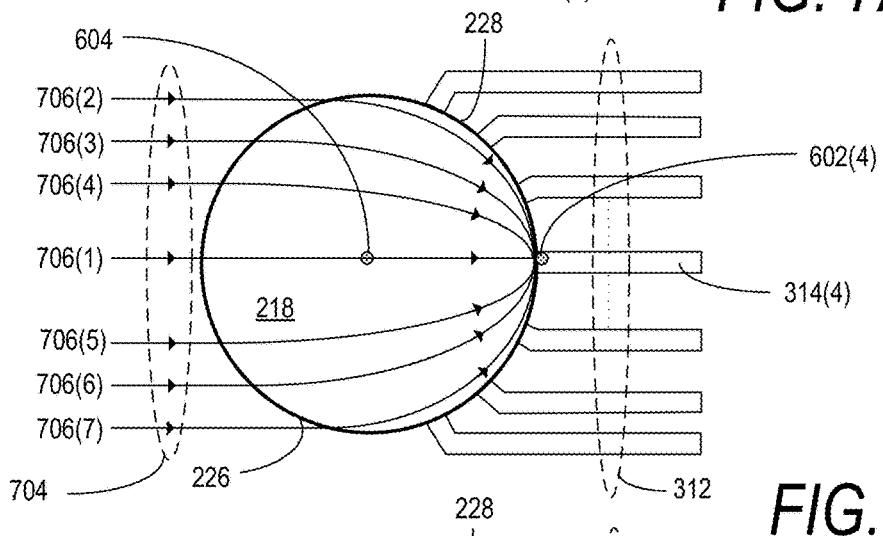
FIG. 7B is a system view of the SDL of FIG. 7A receiving an incident RF signal at a second angle in accordance with the present disclosure.

Similarly, in FIG. 7B, a system view of the SDL 218 of FIG. 7A is shown receiving an incident RF signal 704 at a second angle in accordance with the present disclosure. In this example, the incident plane wave of the incident RF signal 704 is represented by a plurality of parallel waves of radiation 706(1), 706(2), 706(3), 706(4), 706(5), 706(6), and 706(7) impinging on the front surface 226 of the SDL 218. As such, the wave 706(1) that impinges the front surface 226 at a normal passes through the center 604 of the SDL 218 along a centerline of the SDL 218 and exits at focal point 602(4) on the opposite side of the back surface 228 of the SDL 218. The other incident parallel waves of radiation, represented by lines 706(2), 706(3), 706(4), 706(5), 706(6) and 706(7), imping the SDL 218 at various locations along the front surface 226 of the SDL 218 and travel through the SDL 218 in paths dictated by the geometric and refractive properties of the SDL 218 so as to arrive at the same exit location at focal point 602(4). As such, in this example the SDL 218 focuses the most of the energy from the incident RF signal 704 to the focal point 602(4) and passes it to the waveguide 314(4).

Figure 7C:
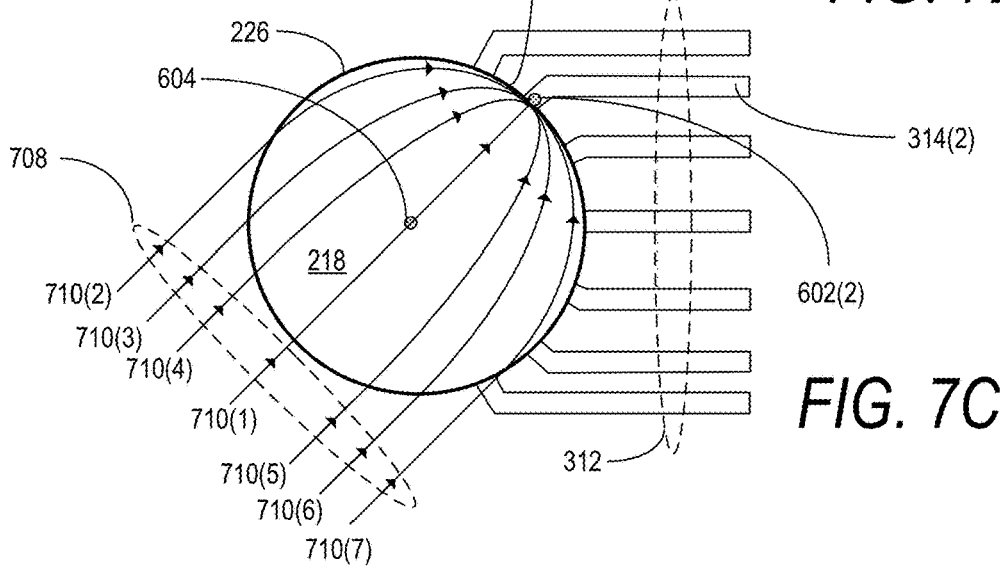
FIG. 7C is a system view of the SDL of FIGS. 7A and 7B receiving an incident RF signal at a third angle in accordance with the present disclosure.

Turning to FIG. 7C, a system view of the SDL 218 of FIGS. 7A and 7B is shown receiving an incident RF signal 708 at a third angle in accordance with the present disclosure. Similar to the examples in FIGS. 7A and 7B, in this example, the incident plane wave of the incident RF signal 708 is represented by a plurality of parallel waves of radiation 710(1), 710(2), 710(3), 710(4), 710(5), 710(6), and 710(7) impinging on the front surface 226 of the SDL 218. As such, the wave 710(1) that impinges the front surface 226 at a normal passes through the center 604 of the SDL 218 along a centerline of the SDL 218 and exits at focal point 602(2) on the opposite side of the back surface 228 of the SDL 218. The other incident parallel waves of radiation, represented by lines 710(2), 710(3), 710(4), 710(5), 710(6) and 710(7), imping the SDL 218 at various locations along the front surface 226 of the SDL 218 and travel through the SDL 218 in paths dictated by the geometric and refractive properties of the SDL 218 so as to arrive at the same exit location at focal point 602(2). As such, in this example the SDL 218 focuses the most of the energy from the incident RF signal 708 to the focal point 602(2) and passes it to the waveguide 314(2). In these examples, the transmitted signals at the focal points 602(6), 602(4), and 602(2) are the focused RF signals of the corresponding incident RF signals 700, 704, and 708, respectively.

Figure 8:
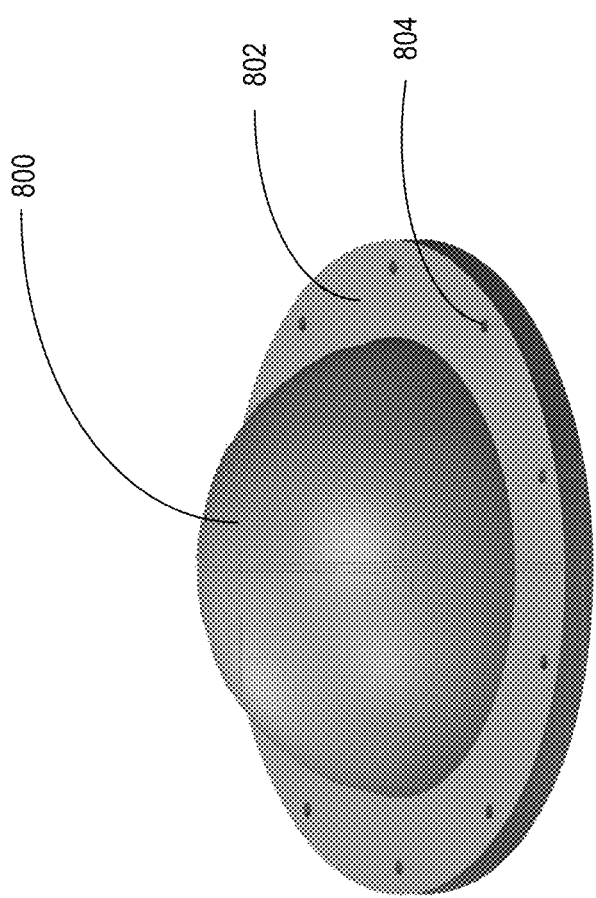
FIG. 8 is a perspective view of an example of an implementation of a radome for use with the SDL in accordance with the present disclosure.

FIG. 8 is a perspective view of an example of an implementation of a radome 800 for optional use with the SDL 218 in accordance with the present disclosure. The radome 800 may include a radome flange 802 that may be attached to the lip 302 of the WAB 220 via pin and screw holes 804 that line up and attach the radome 800 to the lip 302 or to a mounting flange (not shown) of the SDL 218. In this example, the radome 800 may be composed of an electrically transparent material and disposed adjacent to the SDL 218 to protect the front surface 226 of the SDL 218 from damage and/or environmental conditions.

Figure 9:
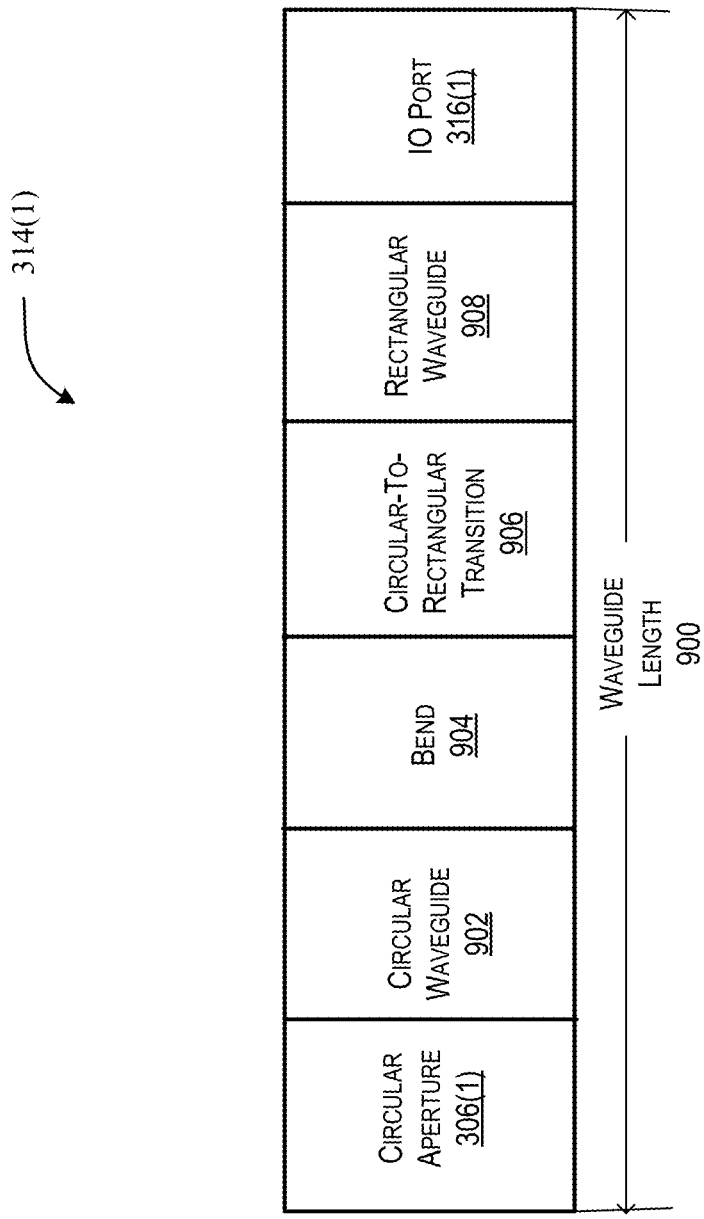
FIG. 9 is a block diagram of an example of an implementation of a waveguide of the plurality of waveguides shown in FIGS. 3B, 6, 7A, 7B, and 7C in accordance with the present invention.

In FIG. 9, a block diagram of an example of an implementation of a waveguide of the plurality of waveguides 312 is shown in accordance with the present invention. In this example, the waveguide is waveguide 314(1) and has a waveguide length 900. The waveguide 314(1) includes the circular aperture 306(1) that is aligned towards the center 604 of the SDL 218, a circular waveguide portion 902, a waveguide directional transition (i.e., bend 904), a waveguide transition from a circular aperture to a rectangular waveguide (i.e., circular-to-rectangular waveguide transition 906), a rectangular waveguide 908, and the IO port 316(1). As stated earlier, the bend 904 may be either H-bends (i.e., a bend that distorts the magnetic field) or E-bends (i.e., a bend that distorts the electric field) for rectangular waveguide. Also, since the waveguide 314(1) includes the circular aperture 306(1) and the circular waveguide 902 portion, this portion of the waveguide 314(1) will generally operate with the $TE_{11}$ mode, which is the dominant mode for a circular waveguide. The circular-to-rectangular waveguide transition 906 will change another portion of the waveguide 314(1) to the rectangular waveguide 908, which will generally operate with the $TE_{10}$ mode, which is the dominant mode for a rectangular waveguide. The IO port 316(1) couples the waveguide 314(1) to the SAM 222.

In FIG. 10, a block diagram of an example of an implementation of the SAM 222 is shown in accordance with the present disclosure. As discussed earlier, the SAM 222 is a device, component, circuit, or module that includes a plurality of selectively activated switches 1000(1), 1000(2), 1000(3), and 1000(N) where each selectively activated switch, of the plurality of selectively activated switches 1000(1), 1000(2), 1000(3), and 1000(N), is in signal communication with a corresponding waveguide from the plurality of waveguides 312 of the WAB 220 and the RAC 224. In this example, only four (4) selectively activated switches 1000(1), 1000(2), 1000(3), and 1000(N) are shown for the purpose of ease of illustration, however there may be up to N selectively activated switches where N corresponds to the number of waveguides in the plurality of waveguides 312 of the WAB 220 and the number of IO ports (not shown) at the RAC 224.

In this example, each selectively activated switch 1000(1), 1000(2), 1000(3), and 1000(N) is configured to conduct or block a waveguide output signal 1002 from the corresponding waveguide IO port (such as 316(1), 316(2), 316(3), 316(4), 316(5), 316(6), and 316(7) in the example of FIG. 3B) of the plurality of waveguides 312 to the RAC 224 if the SAA 118 is operating in a receiving mode. If, instead, the SAA 118 is operating in a transmitting mode, each selectively activated switch 1000(1), 1000(2), 1000(3), and 1000(N) is configured to conduct or block an input RF signal 1004 from the RAC 224 to each corresponding waveguide IO port. In this example, the selectively activated switches 1000(1), 1000(2), 1000(3), and 1000(N) may be waveguide switches. Again, in this example, each selectively activated switch includes a switching device (not shown) that may be, for example, a PIN diode, latching ferrite switch, LCV, coaxial waveguide switch, and an RF isolator.

Figure 11:
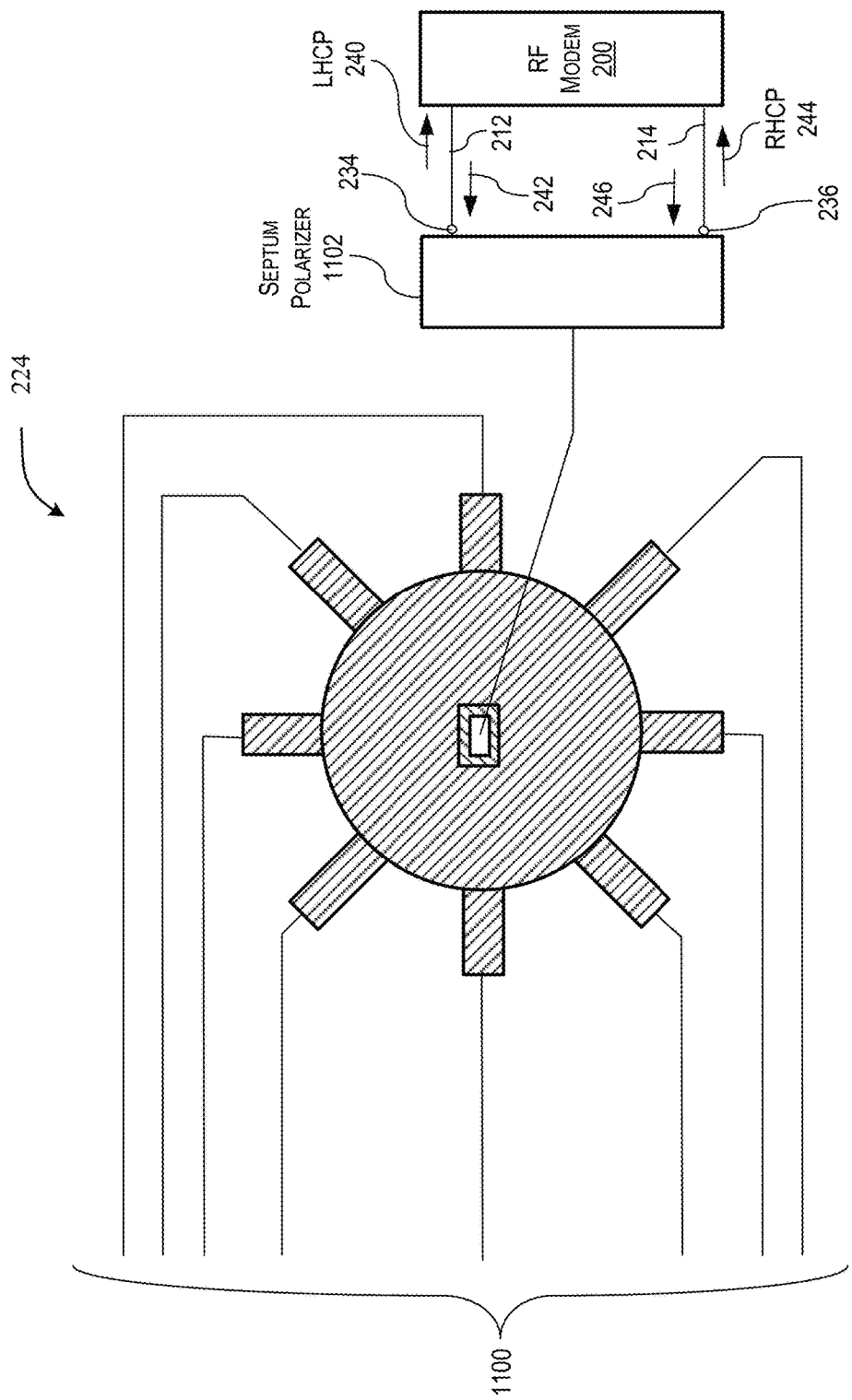
FIG. 11 is a block diagram of an example of an implementation of a radial aperture combiner ("RAC") shown in FIG. 2 in accordance with the present disclosure.

Turing to FIG. 11, a block diagram of an example of an implementation of the RAC 224 is shown in accordance with the present disclosure. As discussed earlier, the RAC 224 is a device, component, circuit, or module that is configured to receive the switched outputs 1100 from the SAM 222 and combine them routes them to the IO ports 234 and 236 in the receiving mode. As an example, the RAC 224 may be a radial power combiner and divider utilizing waveguide, coaxial transmission lines, or solid-state technologies (e.g., striplines or microstrips). In the transmitting mode, the RAC 224 receives an input RF signal (either input RF signals 242 or 246) and routes it to one of more selectively activated switches 1000(1), 1000(2), 1000(3), and 1000(N) in the SAM 222. In this example, two IO ports 234 are 236 are shown to produce or receive polarized RF signals that are routed to or from the RF modem 200 via signal paths 212 and 214, respectively. For example, first IO port 234 is shown to produce the first polarized output signal 240 that is passed from the RAC 224 to the RF modem 200 in a receive mode and, in a transmit mode, to receive the first polarized input signal 242 from the RF modem 200 to the RAC 224. Similarly, the second IO port 236 is shown to produce the second polarized output signal 244 that is passed from the RAC 224 to the RF modem 200 in a receive mode and, in a transmit mode, to receive the second polarized input signal 246 from the RF modem 200 to the RAC 224. Again, in this example, the first polarization may be LHCP and the second polarization may be right-hand circular polarization RHCP. It is appreciated by those of ordinary skill in the art that two IO ports 234 are 236 may include a single waveguide IO port having a polarizer such as, for example, a septum polarizer 1102.

Figure 12:
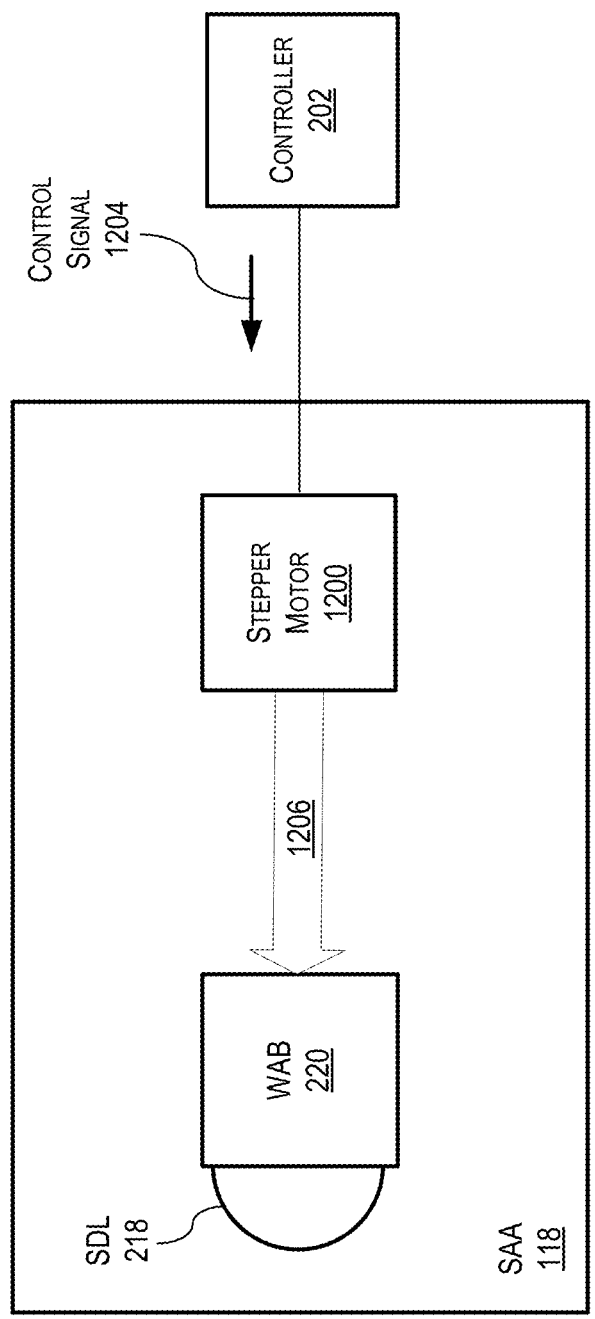
FIG. 12 is a system block diagram of an example of an implementation of a stepper motor for use with the WAB and SDL in accordance with the present disclosure.

In FIG. 12, a system block diagram of an example of an implementation of the stepper motor 1200 for use with the WAB 220 and SDL 218 is shown in accordance with the present disclosure. As discussed earlier, the SAA 118 may also include the stepper motor 1200 that is configured to selectively rotate the WAB 220 and SDL 218 based on a control signal 1204 from the controller 202. In this example, the stepper motor 1200 is operatively coupled to the WAB 220 and/or the SDL 218. A reason for including the stepper motor 1200 in the SAA 118 is that it is possible that the orientation of a particular transceiver relative to the combination of SDL 218 and WAB 220 is inaccurate or not correctly aligned. To address this possible orientation issue, the stepper motor 1200 may be mechanically linked 1206 to WAB 220 and/or SDL 218 to either rotate the WAB 220 or SDL 218 in reference to transceiver located at distant points and oriented at a direction of arrival 206 and direction of departure 218. By rotating WAB 220, different transceivers may be acquired by the SDL 218 that may not be in optimal alignment with the waveguides of WAB 220 based on fixed beam-to-beam spacing.

Figure 13:
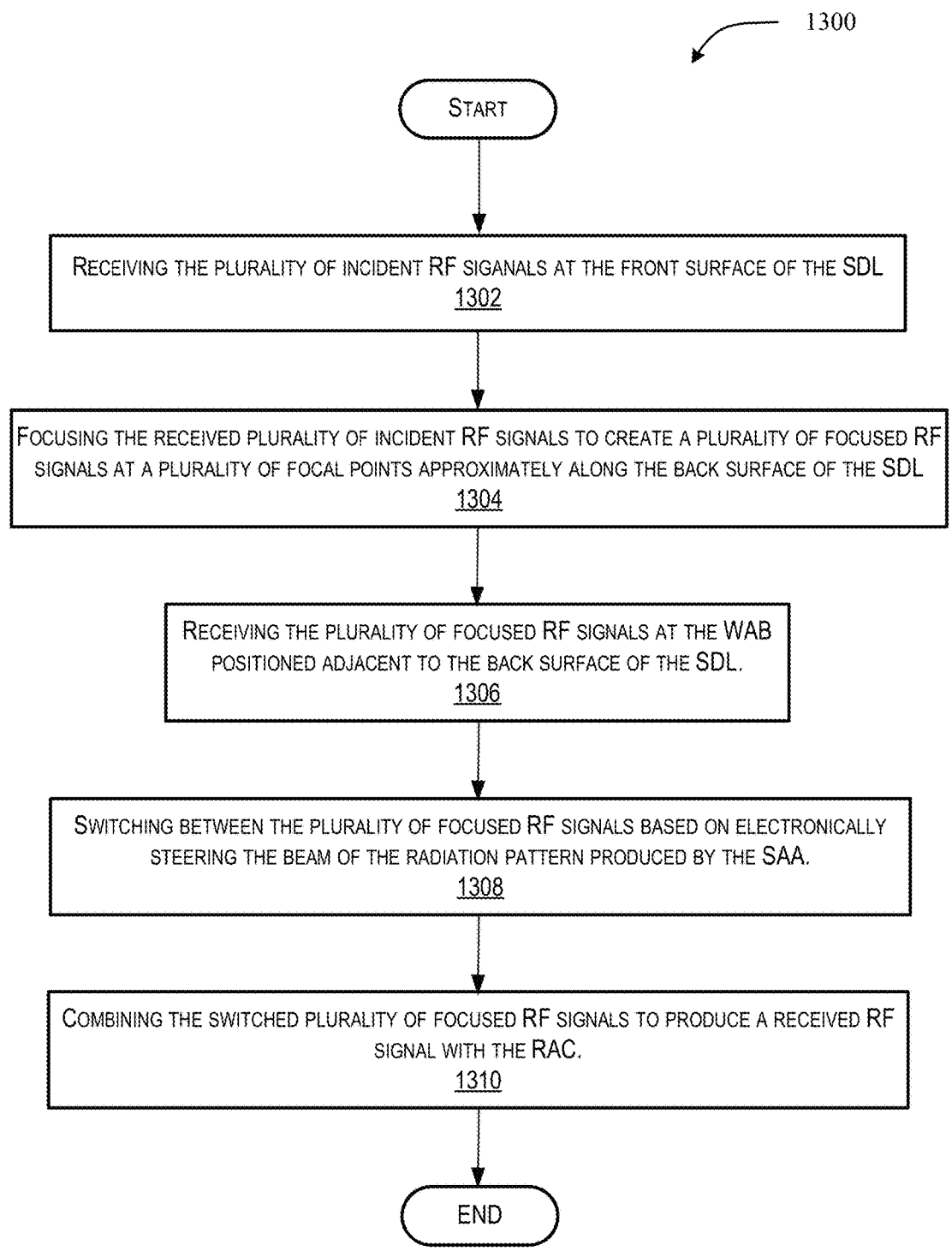
FIG. 13 is a flowchart of an example of an implementation of a method performed by the SAA in accordance with the present disclosure.

FIG. 13 is a flowchart 1300 of an example of an implementation of a method performed by the SAA 118 in accordance with the present disclosure. The method starts by receiving the plurality of incident RF signals 230 at a front surface 226 of an SDL 218, in step 1302, and focusing the received plurality of incident RF signals 230 to create a plurality of focused RF signals at a plurality of focal points approximately along the back surface 228 of the SDL 218 in step 1304. In this example, the plurality of focal points have positions along the back surface 228 of the SDL 218 that correspond to the plurality of incident angles 232 of the plurality of incident RF signals 230. The method further includes receiving the plurality of focused RF signals at the WAB 220 positioned adjacent to the back surface 228 of the SDL 218, in step 1306, and switching between the pluralities of focused RF signals based on electronically steering the beam 114 of the radiation pattern produced by the SAA 118 in step 1308. The method then includes combining the switched plurality of focused RF signals to produce a received RF signal with RAC 224 in step 1310. The method then ends.

The disclosure presented herein may be considered in view of the following clauses.

Clause A, a SAA (118) for receiving a plurality of incident RF signals (230) at a plurality of incident angles (232), the SAA (118) comprising: an approximately SDL (218) having a front surface (226) and a back surface (228), the SDL being operable to receive and focus the plurality of incident RF signals to create a plurality of focused RF signals at a plurality of focal points approximately along the back surface of the SDL, the plurality of focal points having positions along the back surface of the SDL that correspond to the plurality of incident angles of the plurality of incident RF signals; a WAB (220) positioned adjacent to the back surface of the SDL, the WAB being in signal communication with the back surface of the SDL, the WAB being operable to receive the plurality of focused RF signals; a SAM (222) in signal communication with the WAB, the SAM being operable to electronically steer a beam (114) of a radiation pattern produced by the SAA, the SAM being operable to switch between the plurality of focused RF signals based on electronically steering the beam; and a RAC (224) in signal communication with SAM, the RAC being operable to produce a received RF signal from the plurality of focused RF signals.

Clause B, the example of clause A, wherein the SDL has a shape that is approximately a sphere or an oblate spheroid.

Clause C, the example of clause A, wherein the SDL has a sphericity variation that is less than approximately 0.01 wavelength of an operating RF frequency of the SAA.

Clause D, the example of clause C, wherein the SDL has a diameter of approximately 152.4 mm.

Clause E, the example of clause A, wherein the SDL has a dielectric constant approximately between 2 and 5.

Clause F, the example of clause E, wherein the SDL has a gradient of decreasing refractive index radially out from a center of the SDL.

Clause G, the example of clause F, wherein the SDL is a Luneburg lens.

Clause H, the example of clause B, wherein the SDL consists of a material selected from the group consisting of a thermoset plastic, a polycarbonate, a cross-linked polystyrene copolymer, and PTFE.

Clause I, the example of clause B, wherein the WAB (220) includes a concave inner surface (238) positioned adjacent to the back surface (228) of the SDL (218) and a CAA (304) along the concave inner surface (238), wherein the CAA (304) is in signal communication with the back surface (228) of the SDL (218) and wherein the CAA (304) includes a plurality of aperture elements (306(1), 306(2), 306(3), 306(4), 306(5), 306(6), and 306(7)).

Clause J, the example of clause I, wherein the WAB (220) includes a plurality of waveguides (312) in signal communication with the CAA (304), wherein each waveguide (314(1)-314(7)) of the plurality of waveguides (312) includes a waveguide aperture in signal communication with the CAA (304), and wherein each waveguide aperture of each waveguide (314(1)-314(7)) of the plurality of waveguides (312) corresponds to an aperture element (306(1)-306(7)) of the plurality of aperture elements of the CAA (304).

Clause K, the example of clause J, wherein each aperture element of the CAA is an elliptical aperture and wherein each waveguide aperture of the each waveguide of the plurality of waveguides is a correspondingly elliptical aperture.

Clause L, the example of clause K, wherein the each elliptical aperture element of the CAA is a circular aperture and wherein each elliptical aperture of the each waveguide of the plurality of waveguides is a correspondingly circular aperture.

Clause M, the example of clause L, wherein the plurality of waveguides (312) includes a sub-plurality of waveguides and wherein each waveguide of the sub-plurality of waveguides includes a waveguide length (900), a waveguide directional transition (904), and a waveguide transition (906) from the circular aperture to a rectangular waveguide.

Clause N, the example of clause M, wherein the WAB is constructed of metal or metalized plastics.

Clause O, the example of clause M, wherein the SDL has a center (604), wherein each waveguide (314(1)-314(7)) of the plurality of waveguides (312) also includes a waveguide IO port (316(1)-316(7)), wherein each waveguide aperture is aligned with the center of the SDL, wherein each waveguide IO port is aligned the other waveguide IO ports, and wherein each waveguide IO port is in signal communication with the SAM.

Clause P, the example of clause O, wherein each waveguide is a solid-state waveguide.

Clause Q, the example of clause P, wherein each waveguide aperture is a patch antenna.

Clause R, the example of clause O, wherein the SAM includes a plurality of selectively activated switches (1000(1), 1000(2), 1000(3), and 1000(N)), wherein each selectively activated switch (1000(1), 1000(2), 1000(3), and 1000(N)) of the plurality of selectively activated switches (1000(1), 1000(2), 1000(3), and 1000(N)) is in signal communication with a corresponding waveguide (314(1), 314(2), 314(3), 314(4), 314(5), 314(6), and 314(7)) from the plurality of waveguides (312) of the WAB (220) and the RAC (224), and wherein each selectively activated switch (1000(1), 1000(2), 1000(3), and 1000(N)) is configured to conduct or block a waveguide 314(1), 314(2), 314(3), 314(4), 314(5), 314(6), and 314(7)) output signal from the corresponding waveguide IO port (316(1), 316(2), 316(3), 316(4), 316(5), 316(6), and 316(7)) to the RAC (224).

Clause S, the example of clause R, wherein the each selectively activated switch includes a switching device selected from the group consisting of a PIN diode, latching ferrite switch, LCV, coaxial waveguide switch, and an RF isolator.

Clause T, the example of clause S, further including a stepper motor (1200) operatively coupled with the WAB (220) and configured to selectively rotate the WAB and SDL based on a control signal from a controller (202).

Clause U, the example of clause T, wherein the RAC is a radial combiner in signal communication with each waveguide output port and wherein the RAC is configured to produce the received RF signal with either LHCP or RHCP.

Clause V, the example of clause A, wherein the SAA is a reciprocal device, wherein the SDL produces a transmitted RF signal from a received input RF signal at the RAC, wherein the transmitted RF signal has a transmitted beam of the radiation pattern, and wherein the SAM is configured to electronically steer the transmitted beam.

Clause W, the example of clause A, further including a radome (800) disposed adjacent to the front surface (226) of the SDL (218).

Clause X, a user terminal (100) comprising: a SAA (118) for receiving a plurality of incident RF signals (230) at a plurality of incident angles (232), the SAA (118) including an approximately SDL (218) having a front surface (226) and a back surface (228), wherein the SDL (218) is configured to receive and focus the plurality of incident RF signals (230) to create a plurality of focused RF signals at a plurality of focal points approximately along the back surface (228) of the SDL (218) and wherein the plurality of focal points have positions along the back surface (228) of the SDL (218) that correspond to the plurality of incident angles (232) of the plurality of incident RF signals (230), a WAB (220) positioned adjacent to the back surface (228) of the SDL (218), wherein the WAB (220) is in signal communication with the back surface (228) of the SDL (218) and wherein the WAB (220) is configured to receive the plurality of focused RF signals, a SAM (222) in signal communication with the WAB (220), wherein the SAM (222) is configured to electronically steer a (114) beam of a radiation pattern produced by the SAA (118), wherein the SAM (222) is also configured to switch between the plurality of focused RF signals based on electronically steering the beam (114), and a RAC (224) in signal communication with the SAM (222), wherein the RAC (224) is configured to produce a received RF signal from the plurality of focused RF signals; an RF modem (200) in signal communication with the SAA (118), wherein the RF modem (200) is configured to receive the RF signal and demodulate the received RF signal to produce a received base-band signal (248); and a controller (202) in signal communication with the SAA (118) and the RF modem (200), wherein the controller (202) is configured to control the RF modem (200) and the SAM (222) to electronically steer the beam (114).

Clause Y, a method for receiving a plurality of incident RF signals (230) at a plurality of incident angles with a SAA (118), the method comprising: receiving (1302) the plurality of incident RF signals (230) at a front surface (226) of an approximately SDL (218); focusing (1304) the received plurality of incident RF signals (230) to create a plurality of focused RF signals at a plurality of focal points approximately along a back surface (228) of the SDL (218), wherein the plurality of focal points have positions along the back surface (228) of the SDL (218) that correspond to the plurality of incident angles (232) of the plurality of incident RF signals (230); receiving (1306) the plurality of focused RF signals at a WAB (220) positioned adjacent to the back surface (228) of the SDL (218); switching (1308) between the plurality of focused RF signals based on electronically steering a beam (114) of a radiation pattern produced by the SAA (118); and combining (1310) the switched plurality of focused RF signals to produce a received RF signal with a RAC (224).

Clause Z, the example of clause Y, wherein switching includes conducting or blocking a plurality of output signals, from a corresponding plurality of waveguide output ports, from the WAB to the RAC.

Clause AA, the example of clause Z, further including rotating the WAB and SDL with a stepper motor based on a control signal from a controller.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

The flowchart and block diagrams in the different depicted example of implementations illustrate the architecture, functionality, and operation of some possible implementations of apparatuses and methods in an illustrative example. In this regard, each block in the flowchart or block diagrams may represent a module, a segment, a function, a portion of an operation or step, some combination thereof.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

What is claimed is:

1. A user terminal (100) comprising:
   a steerable antenna assembly "SAA" (118) for receiving a plurality of incident radio frequency "RF" signals (230) at a plurality of incident angles (232), the SAA (118) including
      an approximately spherical dielectric lens "SDL" (218) having
         a front surface (226) and
         a back surface (228),
         wherein the SDL (218) is configured to receive and focus the plurality of incident RF signals (230) to create a plurality of focused RF signals at a plurality of focal points approximately along the back surface (228) of the SDL (218) and
         wherein the plurality of focal points have positions along the back surface (228) of the SDL (218) that correspond to the plurality of incident angles (232) of the plurality of incident RF signals (230),
      a waveguide aperture block "WAB" (220) positioned adjacent to the back surface (228) of the SDL (218),
         wherein the WAB (220) is in signal communication with the back surface (228) of the SDL (218) and
         wherein the WAB (220) is configured to receive the plurality of focused RF signals,
      a switch aperture matrix "SAM" (222) in signal communication with the WAB (220),
         wherein the SAM (222) is configured to electronically steer a (114) beam of a radiation pattern produced by the SAA (118), and
         wherein the SAM (222) is also configured to switch between the plurality of focused RF signals based on electronically steering the beam (114), and
      a radial aperture combiner "RAC" (224) in signal communication with the SAM (222),
         wherein the RAC (224) is configured to produce a received RF signal from the plurality of focused RF signals;
   an RF modem (200) in signal communication with the SAA (118), wherein the RF modem (200) is configured to receive the RF signal and demodulate the received RF signal to produce a received base-band signal (248); and
   a controller (202) in signal communication with the SAA (118) and the RF modem (200),
      wherein the controller (202) is configured to control
         the RF modem (200) and
         the SAM (222) to electronically steer the beam (114).

2. The user terminal (100) of claim 1, wherein the SDL has at least one of:
   a shape that is approximately a sphere or an oblate spheroid;
   a sphericity variation that is less than approximately 0.01 wavelength of an operating RF frequency of the SAA;
   a diameter of approximately 152.4 mm;
   a dielectric constant approximately between 2 and 5; and
   a gradient of decreasing refractive index radially out from a center of the SDL.

3. The user terminal (100) of claim 2, wherein the SDL consists of a material selected from the group consisting of a thermoset plastic, a polycarbonate, a cross-linked polystyrene copolymer, and Polytetrafluoroethylene "PTFE".

4. The user terminal (100) of claim 2, wherein the SDL is a Luneburg lens.

5. The user terminal (100) of claim 1, wherein the WAB (220) includes
a concave inner surface (238) positioned adjacent to the back surface (228) of the SDL (218) and
a conformal aperture array antenna "CAA" (304) along the concave inner surface (238),
wherein the CAA (304) is in signal communication with the back surface (228) of the SDL (218) and
wherein the CAA (304) includes a plurality of aperture elements (306(1), 306(2), 306(3), 306(4), 306(5), 306(6), and 306(7)).

6. The user terminal (100) of claim 5,
wherein the WAB (220) includes a plurality of waveguides (312) in signal communication with the CAA (304),
wherein each waveguide (314(1)-314(7)) of the plurality of waveguides (312) includes a waveguide aperture in signal communication with the CAA (304), and
wherein each waveguide aperture of each waveguide (314(1)-314(7)) of the plurality of waveguides (312) corresponds to an aperture element (306(1)-306(7)) of the plurality of aperture elements of the CAA (304).

7. The user terminal (100) of claim 6,
wherein each aperture element of the CAA is an elliptical aperture and
wherein each waveguide aperture of the each waveguide of the plurality of waveguides is a correspondingly elliptical aperture.

8. The user terminal (100) of claim 7,
wherein the each elliptical aperture element of the CAA is a circular aperture and
wherein each elliptical aperture of the each waveguide of the plurality of waveguides is a correspondingly circular aperture.

9. The user terminal (100) of claim 8,
wherein the plurality of waveguides (312) includes a sub-plurality of waveguides and
wherein each waveguide of the sub-plurality of waveguides includes
a waveguide length (900),
a waveguide directional transition (904), and
a waveguide transition (906) from the circular aperture to a rectangular waveguide.

10. The user terminal (100) of claim 9,
wherein the SDL has a center (604),
wherein each waveguide (314(1)-314(7)) of the plurality of waveguides (312) also includes a waveguide input-output "IO" port (316(1)-316(7)),
wherein each waveguide aperture is aligned with the center of the SDL,
wherein each waveguide IO port is aligned the other waveguide IO ports, and
wherein each waveguide IO port is in signal communication with the SAM.

11. The user terminal (100) of claim 10, wherein each waveguide is a solid-state waveguide.

12. The user terminal (100) of claim 10,
wherein the SAM includes a plurality of selectively activated switches (1000(1), 1000(2), 1000(3), and 1000(N)),
wherein each selectively activated switch (1000(1), 1000(2), 1000(3), and 1000(N)) of the plurality of selectively activated switches (1000(1), 1000(2), 1000(3), and 1000(N)) is in signal communication with a corresponding waveguide (314(1), 314(2), 314(3), 314(4), 314(5), 314(6), and 314(7)) from the plurality of waveguides (312) of the WAB (220) and the RAC (224), and
wherein each selectively activated switch (1000(1), 1000(2), 1000(3), and 1000(N)) is configured to conduct or block a waveguide 314(1), 314(2), 314(3), 314(4), 314(5), 314(6), and 314(7)) output signal from the corresponding waveguide IO port (316(1), 316(2), 316(3), 316(4), 316(5), 316(6), and 316(7)) to the RAC (224).

13. The user terminal (100) of claim 12, wherein the each selectively activated switch includes a switching device selected from the group consisting of a PIN diode, latching ferrite switch, liquid crystal valve "LCV", coaxial waveguide switch, and an RF isolator.

14. The user terminal (100) of claim 13, further including a stepper motor (1200) operatively coupled with the WAB (220) and configured to selectively rotate the WAB and SDL based on a control signal from a controller (202).

15. The user terminal (100) of claim 14,
wherein the RAC is a radial combiner in signal communication with each waveguide output port and
wherein the RAC is configured to produce the received RF signal with either left-hand circular polarization "LHCP" or right-hand circular polarization "RHCP".

16. The user terminal (100) of claim 1,
wherein the SAA is a reciprocal device,
wherein the SDL produces a transmitted RF signal from a received input RF signal at the RAC,
wherein the transmitted RF signal has a transmitted beam of the radiation pattern, and
wherein the SAM is configured to electronically steer the transmitted beam.

17. The user terminal (100) of claim 1, further including a radome (800) disposed adjacent to the front surface (226) of the SDL (218).

18. The user terminal (100) of claim 1, wherein switching includes conducting or blocking a plurality of output signals, from a corresponding plurality of waveguide output ports, from the WAB to the RAC.

19. The user terminal (100) of claim 1, wherein switching between the plurality of focused RF signals based on electronically steering the beam (114) with the SAM (222) includes conducting or blocking a plurality of output signals, from a corresponding plurality of waveguide output ports, from the WAB to the RAC.

20. The user terminal (100) of claim 1, wherein the SDL is a Luneburg lens.

* * * * *